US011742776B2

(12) United States Patent
Hanamura et al.

(10) Patent No.: US 11,742,776 B2
(45) Date of Patent: Aug. 29, 2023

(54) POWER CONVERSION DEVICE

(71) Applicant: Panasonic Intellectual Property Management Co., Ltd., Osaka (JP)

(72) Inventors: Kenji Hanamura, Osaka (JP); Wataru Horio, Osaka (JP); Hiroyuki Fujii, Nara (JP); Shogo Hirota, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 83 days.

(21) Appl. No.: 17/613,016

(22) PCT Filed: Feb. 21, 2020

(86) PCT No.: PCT/JP2020/006976
§ 371 (c)(1),
(2) Date: Nov. 19, 2021

(87) PCT Pub. No.: WO2020/235156
PCT Pub. Date: Nov. 26, 2020

(65) Prior Publication Data
US 2022/0321027 A1 Oct. 6, 2022

(30) Foreign Application Priority Data
May 21, 2019 (JP) .................................. 2019-095461

(51) Int. Cl.
*H02M 7/483* (2007.01)
*H02M 1/00* (2006.01)
(Continued)

(52) U.S. Cl.
CPC ....... *H02M 7/4837* (2021.05); *H02M 1/0009* (2021.05); *H02M 1/0095* (2021.05);
(Continued)

(58) Field of Classification Search
CPC .. H02M 7/4837; H02M 1/0009; H02M 1/325; H02M 1/0095; H02M 7/483; H02M 7/5395
See application file for complete search history.

(56) References Cited

U.S. PATENT DOCUMENTS 11,201,563 B2 12/2021 Slepchenkov
11,451,163 B2* 9/2022 Kidera ................ H02M 7/4833
(Continued)

FOREIGN PATENT DOCUMENTS

WO  2015030152 A1  3/2015
WO  2018/231810    12/2018
(Continued)

OTHER PUBLICATIONS

International Search Report issued in corresponding International Patent Application No. PCT/JP2020/006976, dated Jun. 2, 2020, with English translation.
(Continued)

*Primary Examiner* — Adolf D Berhane
(74) *Attorney, Agent, or Firm* — McDermott Will & Emery LLP

(57) ABSTRACT

An inverter circuit includes a plurality of flying capacitors and converts a DC voltage supplied from a DC power supply into an AC voltage. A filter circuit approximates a waveform of an output voltage of the inverter circuit to a sinusoidal wave. An excess current protection circuit supplies a block signal for turning off a plurality of switching elements to the driving circuit when an excess current is detected. When at least one of an abnormal voltage in any of the plurality of flying capacitors and an abrupt change in an output voltage of the power converter occurs, voltages other than a positive voltage of the DC power supply, a negative voltage of the
(Continued)

DC power supply, and a zero voltage are restricted from being output from the inverter circuit.

8 Claims, 13 Drawing Sheets

(51) Int. Cl.
*H02M 1/32* (2007.01)
*H02M 7/5395* (2006.01)

(52) U.S. Cl.
CPC ........... *H02M 1/325* (2021.05); *H02M 7/483* (2013.01); *H02M 7/5395* (2013.01)

(56) References Cited

U.S. PATENT DOCUMENTS

2013/0343103 A1 12/2013 Takizawa
2020/0177099 A1 6/2020 Slepchenkov
2021/0367532 A1 11/2021 Kidera et al.

FOREIGN PATENT DOCUMENTS

WO 2019/069654 A1 4/2019
WO WO-2019111497 A1 * 6/2019 .............. H02M 7/48

OTHER PUBLICATIONS

Extended European Search Report issued for corresponding European Patent Application No. 20809381.5, dated Jun. 8, 2022.
G. P. Adam et al., "New Efficient Submodule for a Modular Multilevel Converter in Multiterininal HVDC Networks," IEEE Transactions on Power Electronics, vol. 32, No. 6, Jun. 2017, pp. 4258-4278.
Q.A. Le et al., "Diagnosis of Open-Circuit Faults for Six-Level Hybrid Inverters," IEEE, 2017, pp. 1099-1104.
B.R. Lin et al., "Bi-directional single-phase halt-bridge rectifier for power quality compensation," IEE Proc.-Electr. Power Appl., vol. 150, No. 4, Jul. 2003, pp. 397-406.
B.M. Song et al, "A Multilevel Soft-Switching Inverter with Inductor Coupling," IEEE, 2000, pp. 2100-2107.

* cited by examiner

FIG. 3

| INVERTER OUTPUT VOLTAGE $V_{inv}$ | CHARGE/DISCHARGE STATE | | | | SWITCHING PATTERN | | | | | |
|---|---|---|---|---|---|---|---|---|---|---|
| | C1 | C2 | C3 | C4 | Q1,Q5 Q12,Q16 | Q2,Q6 Q11,Q15 | Q3,Q7 Q10,Q14 | Q4,Q8 Q9,Q13 | Q17,Q18 Q23,Q24 | Q19,Q20 Q21,Q22 |
| +E | — | — | — | — | ON | ON | OFF | OFF | ON | OFF |
| +1/2E | CHARGE | — | — | CHARGE | ON | OFF | ON | OFF | ON | OFF |
| +1/2E | DISCHARGE | — | — | DISCHARGE | OFF | ON | OFF | ON | ON | OFF |
| +0 | — | — | — | — | OFF | OFF | ON | OFF | ON | OFF |
| −0 | — | — | — | — | ON | OFF | OFF | OFF | OFF | ON |
| −1/2E | — | DISCHARGE | DISCHARGE | — | ON | OFF | ON | OFF | OFF | ON |
| −1/2E | — | CHARGE | CHARGE | — | OFF | ON | OFF | ON | OFF | ON |
| −E | — | — | — | — | OFF | OFF | ON | ON | OFF | ON |
| | | | | | HALF CYCLE | COMPLEMENTARY | COMPLEMENTARY | HALF CYCLE | FUNDAMENTAL WAVE HALF CYCLE (POSITIVE) ALWAYS ON | FUNDAMENTAL WAVE HALF CYCLE (NEGATIVE) ALWAYS ON |

OUTPUT = +0

OUTPUT = +1/2E(CHARGE)

OUTPUT = +1/2E(DISCHARGE)

OUTPUT = +E

OUTPUT=-0

OUTPUT=-1/2E(CHARGE)

OUTPUT=-1/2E(DISCHARGE)

OUTPUT=-E

POWER CONVERSION DEVICE

CROSS-REFERENCE TO RELATED APPLICATIONS

This application is the U.S. National Phase under 35 U.S.C. § 371 of International Application No. PCT/JP2020/006976, filed on Feb. 21, 2020, which claims the benefit of Japanese Application No. 2019-095461, filed on May 21, 2019, the entire contents of each are hereby incorporated by reference.

TECHNICAL FIELD

The present invention relates to power converters that convert a DC power into an AC power.

BACKGROUND ART

Highly efficient power conversion and compact design are required of power conditioners connected to solar cells, storage batteries, fuel cells, etc. A multilevel power converter makes it possible to reduce a voltage applied to switching elements and so reduces switching loss and realizes highly efficient power conversion. A flying capacitor system is known as a typical system to implement a multilevel power converter (see, for example, patent literature 1).

Metal-oxide-semiconductor field-effect transistors (MOSFET) having a withstand voltage of 600 V, 300 V, and 150 V are often used as switching elements of a power conditioner. Generally speaking, the lower the withstand voltage of a switching element, the lower the conduction loss and the switching loss and the smaller the size.

When a switching element having a low withstand voltage is used, it is necessary to provide a protection function for preventing the element from being broken due to a voltage in excess of the withstand voltage. In flying capacitor multilevel power converters, it is common to protect switching elements from a voltage in excess of the withstand voltage by measuring and monitoring the voltage applied to the flying capacitor. When an excess voltage or an insufficient voltage occurs in a flying capacitor, it is determined that a voltage in excess of the withstand voltage is applied to the switching element, and the inverter is suspended.

In Japan, power conditioners used in distributed power supplies such as solar power generating facilities are required to meet the faut ride through (FRT) requirement stipulated in Grid Interconnection Regulations in order to be authenticated by Japan Electrical Safety & Environment Technology Laboratories (JET). The FRT requirement stipulates the capabilities to continue the operation in the event of a grid disturbance such as a drop in the instantaneous voltage in the power grid. The FRT requirement (revised in April, 2017) requires that the operation be continued for 0.3 seconds in the event of a voltage drop to a remaining voltage level of 20% or higher. A voltage drop to a remaining voltage level of lower than 20% is basically expected to be addressed by continuing the operation for 0.3 seconds but is permitted to be addressed by gate block of the inverter. After the voltage returns, it is required to return to an output that is 80% or higher of the output before the voltage drop within 0.1 seconds of the return in the case the remaining voltage level is 20% or higher and within 1.0 second of the return in the case the remaining voltage level is lower than 20%.

When a drop in the instantaneous voltage occurs, an excess current occurs easily. In a power conditioner used in a distributed power supply, this is often addressed by providing a pulse-by-pulse excess current protection circuit. When detecting an excess current, the excess current protection circuit inhibits the current by blocking a gate signal input to all switching elements forming the inverter. This excess current protection does not suspend the operation of the inverter and so can meet the requirement for continuation of operation stipulated in the FRT requirement.

[Patent Literature 1] WO2015/030152

SUMMARY OF INVENTION

Technical Problem

In flying capacitor multilevel power converters, the operation of the inverter may possibly be suspended due to an excess voltage of the flying capacitor even if the above-described excess current protection circuit is used to suppress an excess current without suspending the operation of the inverter when a drop in the instantaneous voltage occurs. If, for example, the excess current protection circuit is timed to operate such that the excess current protection function is turned on (gate block) when the flying capacitor is discharged, and the excess current protection function is turned off when the flying capacitor is charged, the amount of charge will be larger than the amount of discharge with the result that an excess voltage (excess charge) occurs. If the operation of the excess current protection circuit is timed oppositely, the amount of charge will be smaller than the amount of discharge with the result that an insufficient voltage (excess discharge) occurs.

The present disclosure addresses the above-described issue, and a general purpose thereof is to provide a technology for ensuring continuation of operation required in the event of a grid disturbance in flying capacitor multilevel power converters.

Solution to Problem

The power converter according to an embodiment of the present disclosure includes: an inverter circuit that converts a DC voltage supplied from a DC power supply into an AC voltage; a filter circuit that approximates a waveform of an output voltage of the inverter circuit to a sinusoidal wave; a driving circuit that drives a plurality of switching elements included in the inverter circuit; and an excess current protection circuit that supplies a block signal for turning off the plurality of switching elements to the driving circuit when an excess current is detected. The inverter circuit includes: a multilevel output unit that includes a plurality of flying capacitors and is capable of outputting a potential at five or more levels from two nodes; and a polarity switching unit that controls a direction of a current flowing between the two nodes of the multilevel output unit. When at least one of an abnormal voltage in any of the plurality of flying capacitors and an abrupt change in an output voltage of the power converter occurs, voltages other than a positive voltage of the DC power supply, a negative voltage of the DC power supply, and a zero voltage are restricted from being output from the inverter circuit.

Advantageous Effects of Invention

According to this disclosure, continuation of operation required in the event of a grid disturbance can be secured in flying capacitor multilevel power converters.

BRIEF DESCRIPTION OF DRAWINGS

FIG. 3 shows a set of switching patterns of the first switching element-the twenty-fourth switching element in the power converter of FIG. 1;

DESCRIPTION OF EMBODIMENTS

Figure 1:
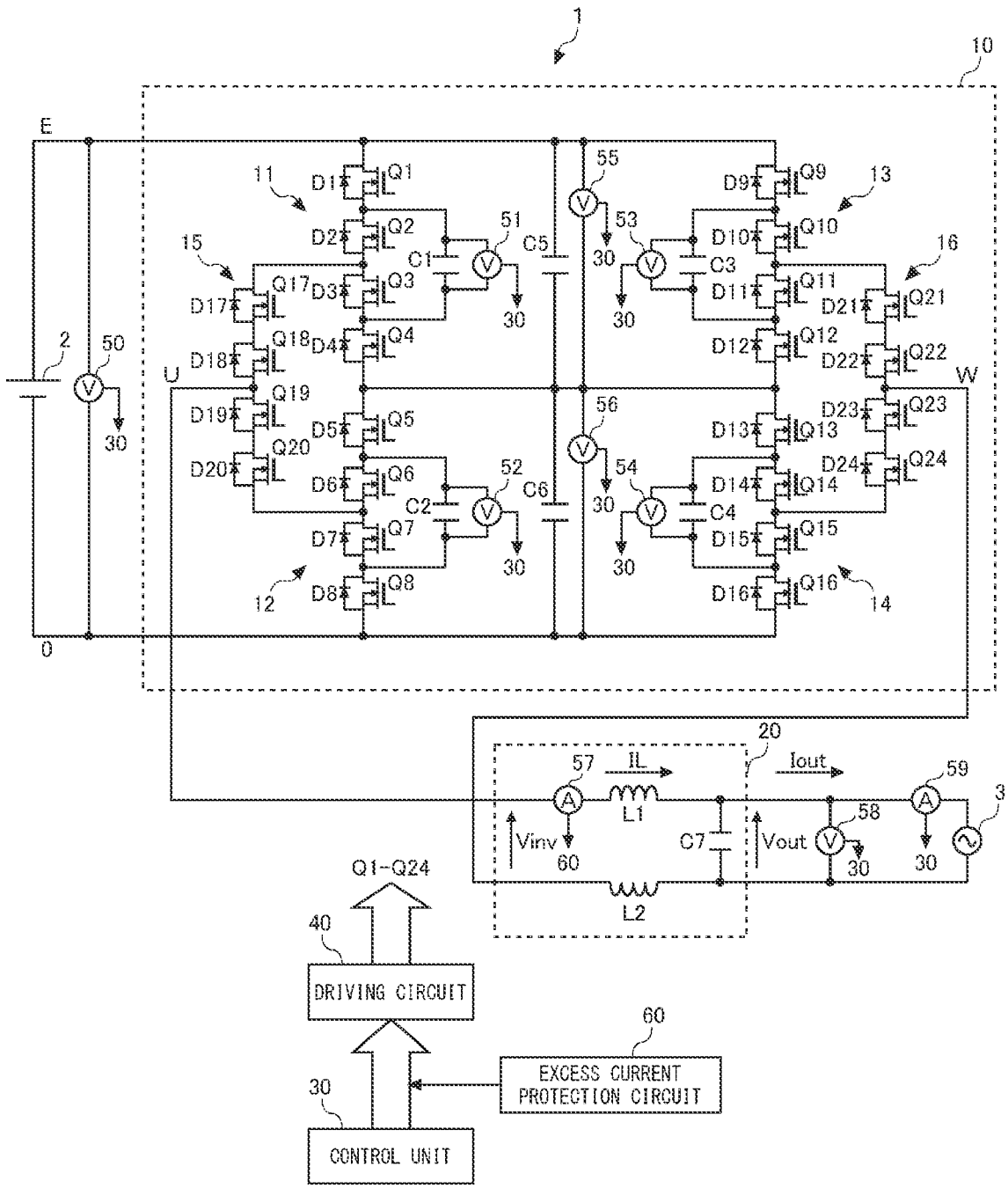
FIG. 1 shows the configuration of a power converter according to an embodiment.

FIG. 1 shows the configuration of a power converter 1 according to an embodiment. The power converter 1 converts a DC power supplied from a DC power supply 2 into an AC power and outputs the AC power from the conversion to a commercial power grid (hereinafter, simply referred to as a grid 3). The DC power supply 2 is comprised of, for example, a distributed power supply (solar cell, storage battery, fuel cell, etc.) and a DC/DC converter capable of controlling the output of the distributed power supply. A DC bus connects the DC/DC converter and the power converter 1. The DC power supply 2 may be comprised of a plurality of sets connected in parallel, each set including a distributed power supply and a DC/DC converter.

The power converter 1 includes an inverter circuit 10, a filter circuit 20, a control unit 30, a driving circuit 40, and an excess current protection circuit 60. The inverter circuit 10 converts a DC voltage supplied from the DC power supply 2 into an AC voltage. The inverter circuit 10 is capable of generating a pseudo sinusoidal wave having a multilevel (five levels, in the embodiment) voltage based on the DC voltage supplied from the DC power supply 2. The inverter circuit 10 includes a plurality of flying capacitor circuits and includes a multilevel output unit capable of outputting a potential at five or more levels and a polarity switching unit for controlling the direction of the current flowing between two nodes of the multilevel output unit. In the example shown in FIG. 1, the multilevel output unit includes a first flying capacitor circuit 11, a second flying capacitor circuit 12, a third flying capacitor circuit 13, and a fourth flying capacitor circuit 14. The polarity switching unit includes a first output circuit 15 and a second output circuit 16.

The first flying capacitor circuit 11 and the second flying capacitor circuit 12 are connected in series between the ends of the DC power supply 2. The third flying capacitor circuit 13 and the fourth flying capacitor circuit 14 are connected in series between the ends of the DC power supply 2. The node between the first flying capacitor circuit 11 and the second flying capacitor circuit 12 and the node between the third flying capacitor circuit 13 and the fourth flying capacitor circuit 14 are connected by an intermediate wiring.

The first flying capacitor circuit 11 includes a first switching element Q1, a second switching element Q2, a third switching element Q3, a fourth switching element Q4, and a first flying capacitor C1. The first switching element Q1, the second switching element Q2, the third switching element Q3, and the fourth switching element Q4 are connected in series and connected between the positive-side bus of the DC power supply 2 and the intermediate wiring. The first flying capacitor C1 is connected between i) the node between the first switching element Q1 and the second switching element Q2 and ii) the node between the third switching element Q3 and the fourth switching element Q4 and is charged and discharged by the first switching element Q1-the fourth switching element Q4.

The second flying capacitor circuit 12 includes a fifth switching element Q5, a sixth switching element Q6, a seventh switching element Q7, an eighth switching element Q8, and a second flying capacitor C2. The fifth switching element Q5, the sixth switching element Q6, the seventh switching element Q7, and the eighth switching element Q8 are connected in series and connected between the intermediate wiring and the negative-side bus of the DC power supply 2. The second flying capacitor C2 is connected between i) the node between the fifth switching element Q5 and the sixth switching element Q6 and ii) the node between the seventh switching element Q7 and the eighth switching element Q8 and is charged and discharged by the fifth switching element Q5-the eighth switching element Q8.

The third flying capacitor circuit 13 includes a ninth switching element Q9, a tenth switching element Q10, an eleventh switching element Q11, a twelfth switching element Q12, and a third flying capacitor C3. The ninth switching element Q9, the tenth switching element Q10, the eleventh switching element Q11, and the twelfth switching element Q12 are connected in series and connected between the positive-side bus of the DC power supply 2 and the intermediate wiring. The third flying capacitor C3 is connected between i) the node between the ninth switching element Q9 and the tenth switching element Q10 and ii) the node between the eleventh switching element Q11 and the twelfth switching element Q12 and is charged and discharged by the ninth switching element Q9-the twelfth switching element.

The fourth flying capacitor circuit 14 includes a thirteenth switching element Q13, a fourteenth switching element Q14, a fifteenth switching element Q15, a sixteenth switching element Q16, and a fourth flying capacitor C4. The thirteenth switching element Q13, the fourteenth switching element Q14, the fifteenth switching element Q15, and the sixteenth switching element Q16 are connected in series and connected between the intermediate wiring and the negative-side bus of the DC power supply 2. The fourth flying capacitor C4 is connected between i) the node between the thirteenth switching element Q13 and the fourteenth switching element Q14 and ii) the node between the fifteenth switching element Q15 and the sixteenth switching element Q16 and is charged and discharged by the thirteenth switching element Q13-the sixteenth switching element Q16.

The first output circuit 15 is connected between the midpoint of the first flying capacitor circuit 11 (specifically, the node between the second switching element Q2 and the third switching element Q3) and the midpoint of the second flying capacitor circuit 12 (specifically, the node between the sixth switching element Q6 and the seventh switching element Q7). The first output circuit 15 includes a seventeenth switching element Q17, an eighteenth switching element Q18, a nineteenth switching element Q19, and a twentieth switching element Q20 connected in series. The midpoint of the first output circuit 15 (specifically, the node between the eighteenth switching element Q18 and the nineteenth switching element Q19) is connected to one end of an AC path connected to the grid 3 via the filter circuit 20.

The second output circuit 16 is connected between the midpoint of the third flying capacitor circuit 13 (specifically, the node between the tenth switching element Q10 and the eleventh switching element Q11) and the midpoint of the fourth flying capacitor circuit 14 (specifically, the node between the fourteenth switching element Q14 and the fifteenth switching element Q15). The second output circuit 16 includes a twenty-first switching element Q21, a twenty-second switching element Q22, a twenty-third switching element Q23, and a twenty-fourth switching element Q24 connected in series. The midpoint of the second output circuit 16 (specifically, the node between the twenty-second switching element Q22 and the twenty-third switching element Q23) is connected to the other of the above AC path via the filter circuit 20.

A first split capacitor C5 and a second split capacitor C6 are connected in series between the positive-side bus and the negative-side bus of the DC power supply 2. Specifically, the first split capacitor C5 is connected between the positive-side bus and the intermediate wiring, and the second split capacitor C6 is connected between the intermediate wiring and the negative-side bus. The first split capacitor C5 and the second split capacitor C6 have the function of dividing the voltage E of the DC power supply 2 to ½ and the function of snubber capacitors for suppressing the surge voltage occurring in the inverter circuit 10.

A potential in a range between E [V] applied to the upper terminal of the first switching element Q1 and ½E [V] applied to the lower terminal of the fourth switching element Q4 is output from the midpoint of the first flying capacitor circuit 11. The first flying capacitor C1 is pre-charged to a voltage ¼E [V] and is repeatedly charged and discharged around the voltage ¼E [V]. Therefore, a potential at three levels, i.e., E [V], ¾E [V], ½E [V], generally, is output from the first flying capacitor circuit 11.

A potential in a range between ½E [V] applied to the upper terminal of the fifth switching element Q5 and 0 [V] applied to the lower terminal of the eighth switching element Q8 is output from the midpoint of the second flying capacitor circuit 12. The second flying capacitor C2 is pre-charged to a voltage ¼E [V] and is repeatedly charged and discharged around the voltage ¼E [V]. Therefore, a potential at three levels, i.e., ½E [V], ¼E [V], 0 [V], generally, is output from the second flying capacitor circuit 12.

A potential in a range between E [V] applied to the upper terminal of the ninth switching element Q9 and ½E [V] applied to the lower terminal of the twelfth switching element Q12 is output from the midpoint of the third flying capacitor circuit 13. The third flying capacitor C3 is pre-charged to a voltage ¼E [V] and is repeatedly charged and discharged around the voltage ¼E [V]. Therefore, a potential at three levels, i.e., E [V], ¾E [V], ½E [V], generally, is output from the third capacitor circuit 13.

A potential in a range between ½E [V] applied to the upper terminal of the thirteenth switching element Q13 and 0 [V] applied to the lower terminal of the sixteenth switching element Q16 is output from the midpoint of the fourth flying capacitor circuit 14. The fourth flying capacitor C4 is pre-charged to a voltage ¼E [V] and is repeatedly charged and discharged around the voltage ¼E [V]. Therefore, a potential at three levels, i.e., ½E [V], ¼E [V], 0 [V], generally, is output from the fourth flying capacitor circuit 14.

First diode D1-twenty-fourth diode D24 are connected in antiparallel with the first switching element Q1-the twenty-fourth switching element Q24. In the following description of the embodiment, it is assumed that an N-channel MOSFET having a withstand voltage of 150V is used as the first switching element Q1-the twenty-fourth switching element Q24. In an N-channel MOSFET, a parasitic diode is formed in a direction from the source to the drain.

An insulated gate bipolar transistor (IGBT) or a bipolar transistor may be used as the first switching element Q1-the twenty-fourth switching element Q24. In that case, a parasitic diode is not formed in the first switching element Q1-the twenty-fourth switching element Q24, and an external diode is connected antiparallel with each of the first switching element Q1-the twenty-fourth switching element Q24.

A multilevel (five levels, in the case of the embodiment) voltage is output from the midpoint of the first output circuit 15 (specifically, the node between the eighteenth switching element Q18 and the nineteenth switching element Q19) and the midpoint of the second output circuit 16 (specifically, the node between the twenty-second switching element Q22 and the twenty-third switching element Q23) to the filter circuit 20. The larger the number of levels, the closer the pseudo sinusoidal wave to the regular sinusoidal wave. In this embodiment, a U-phase power is output from the midpoint of the first output circuit 15, and a W-phase power is output from the midpoint of the second output circuit 16.

The filter circuit 20 includes a first reactor L1, a second reactor L2, and a third output capacitor C9. The filter circuit 20 attenuates high-frequency components of the voltage and the current output from the first output circuit 15 and the second output circuit 16 and approximates the wave to a sinusoidal wave synchronized with the sinusoidal wave of the grid 3.

A bus voltage measurement unit 50 measures the voltage across the DC bus between the DC power supply 2 and the power converter 1 and outputs the measured voltage to the control unit 30. A first voltage measurement unit 51 measures the voltage across the first flying capacitor C1 and outputs the measured voltage to the control unit 30. A second voltage measurement unit 52 measures the voltage across the second flying capacitor C2 and outputs the measured voltage to the control unit 30. A third voltage measurement unit 53 measures the voltage across the third flying capacitor C3 and outputs the measured voltage to the control unit 30. A fourth voltage measurement unit 54 measures the voltage across the fourth flying capacitor C4 and outputs the measured voltage to the control unit 30. A first intermediate voltage measurement unit 55 measures the voltage between the positive-side bus and the intermediate wiring and outputs the measured voltage to the control unit 30. A second intermediate voltage measurement unit 56 measures the voltage between the intermediate wiring and the negative-side bus and outputs the measured voltage to the control unit 30. One of the first intermediate voltage measurement unit 55 and the second intermediate voltage measurement unit 56 can be omitted. The intermediate voltage in the part where the unit is omitted can be determined by subtracting the other intermediate voltage from the bus voltage.

A reactor current measurement unit 57 measures the current IL flowing in the first reactor L1 and outputs the measured current to the control unit 30 and the excess current protection circuit 60. An output voltage measurement unit 58 measures the output voltage Vout of the power converter 1 and outputs the measured voltage to the control unit 30. An output current measurement unit 59 measures the output current Iout of the power converter 1 and outputs the measured current to the control unit 30. Each voltage measurement unit can be comprised of, for example, a resistance voltage division circuit and a differential amplifier. Each current measurement unit can be comprised of, for example, a CT sensor.

The control unit 30 supplies control signals for controlling on/off of the first switching element Q1-the twenty-fourth switching element Q24 to the driving circuit 40. In this embodiment, a PWM signal is used as the control signal. The driving circuit 40 drives the first switching element Q1-the twenty-fourth switching element Q24 based on the PWM signal supplied from the control unit 30.

The control unit 30 causes the inverter circuit 10 to convert the DC power supplied from the DC power supply 2 into an AC power by supplying the PWM signal to the driving circuit 40. Further, the control unit 30 causes the inverter circuit 10 to convert the AC power supplied from the grid 3 into a DC power by supplying the PWM signal to the driving circuit 40. The control unit 30 is implemented by the coordination of hardware resources and software resources, or hardware resources alone. A microcomputer, DSP, ROM, RAM, FPGA, ASIC, and other LSIs can be used as hardware resources. Programs such as firmware can be used as software resources.

When an excess current is detected in the power converter 1, the excess current protection circuit 60 supplies a gate block signal for turning off the first switching element Q1-the twenty-fourth switching element Q24 to the driving circuit 40. The excess current protection circuit 60 is operated according to the pulse-by-pulse system and directly controls the driving circuit 40 without the intervention of the control unit 30 (hardware control). Specific exemplary configurations of the control unit 30, the driving circuit 40, and the excess current protection circuit 60 will be described later.

Figure 2:
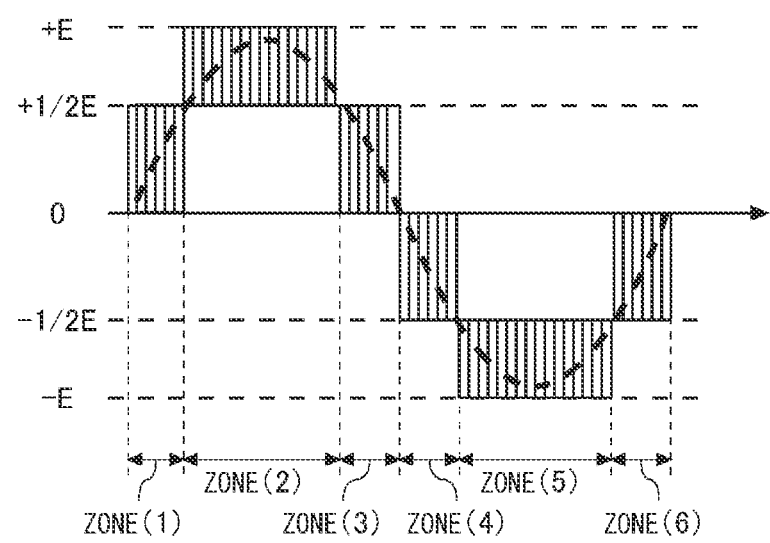
FIG. 2 shows a pseudo sinusoidal wave generated by a voltage at five levels (+E, +½E, 0, −½E, −E)

FIG. 2 shows a pseudo sinusoidal wave generated by a voltage at five levels (+E, +½E, 0, −½E, −E). +½E and 0 are alternately output in a zone (1), +E and +½E are alternately output in a zone (2), +½E and 0 are alternately output in a zone (3), 0 and −½E are alternately output in a zone (4), −½E and −E are alternately output in a zone (5), and 0 and −½E are alternately output in a zone (6). In this way, a pseudo sinusoidal wave for one period is generated. When the voltage Vinv (pseudo sinusoidal wave) of the inverter circuit 10 is generated with a high quality, the output current Iout past the filter circuit 20 will be a smooth sinusoidal wave.

FIG. 3 shows a set of switching patterns of the first switching element Q1-the twenty-fourth switching element Q24 in the power converter 1 of FIG. 1.

In the switching patterns shown in FIG. 3, the group comprised of the first switching element Q1, the fifth switching element Q5, the twelfth switching element Q12, and the sixteenth switching element Q16, and the group comprised of the fourth switching element Q4, the eighth switching element Q8, the ninth switching element Q9, the thirteenth switching element Q13 are in a complementary relationship. The group comprised of the second switching element Q2, the sixth switching element Q6, the eleventh switching element Q11, and the fifteenth switching element Q15, and the group comprised of the third switching element Q3, the seventh switching element Q7, the tenth switching element Q10, the fourteenth switching element Q14 are in a complementary relationship.

Further, the group comprised of the first switching element Q1, the fifth switching element Q5, the twelfth switching element Q12, and the sixteenth switching element Q16, and the group comprised of the second switching element Q2, the sixth switching element Q6, the eleventh switching element Q11, the fifteenth switching element Q15 have a phase difference of half cycle (180°). The group comprised of the third switching element Q3, the seventh switching element Q7, the tenth switching element Q10, and the fourteenth switching element Q14, and the group comprised of the fourth switching element Q4, the eighth switching element Q8, the ninth switching element Q9, the thirteenth switching element Q13 have a phase difference of half cycle (180°).

Further, the group comprised of the seventeenth switching element Q17, the eighteenth switching element Q18, the twenty-third switching element Q23, and the twenty-fourth switching element Q24 is always turned on during the positive half cycle of the fundamental wave and is always turned off during the negative half cycle. The group comprised of the nineteenth switching element Q19, the twentieth switching element Q20, the twenty-first switching element Q21, and the twenty-second switching element Q22 is always turned on during the negative half cycle of the fundamental wave and is always turned off during the positive half cycle. In Japan, the fundamental wave is a 50 Hz/60 Hz sinusoidal wave.

FIGS. 4A-4D are circuit diagrams representing those of the switching patterns shown in FIG. 3 in the positive half cycle. FIGS. 5A-5D are circuit diagrams representing those of the switching patterns shown in FIG. 3 in the negative half cycle. MOSFETs are drawn in simple switching symbols for simplification of the drawings.

Figure 4A:
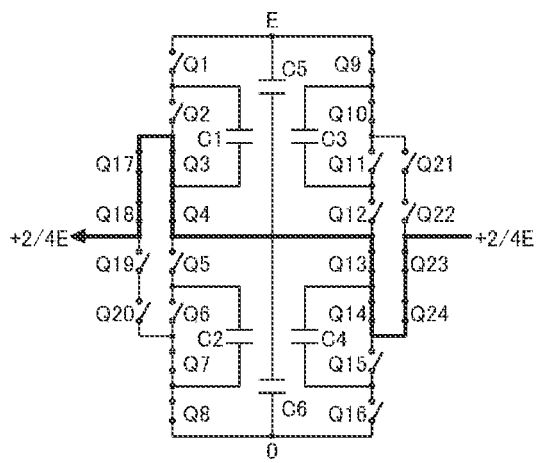
FIGS. 4A-4D are circuit diagrams representing those of the switching patterns shown in FIG. 3 in the positive half cycle.

When, as shown in FIG. 4A, +0 is output from the inverter circuit 10, the control unit 30 controls the third switching element Q3, the fourth switching element Q4, the seventh switching element Q7, the eighth switching element Q8, the ninth switching element Q9, the tenth switching element Q10, the thirteenth switching element Q13, the fourteenth switching element Q14, the seventeenth switching element Q17, the eighteenth switching element Q18, the twenty-third switching element Q23, and the twenty-fourth switching element Q24 to be in an on state and controls the first switching element Q1, the second switching element Q2, the fifth switching element Q5, the sixth switching element Q6, the eleventh switching element Q11, the twelfth switching element Q12, the fifteenth switching element Q15, the sixteenth switching element Q16, the nineteenth switching element Q19, the twentieth switching element Q20, the twenty-first switching element Q21, and the twenty-second switching element Q22 to be in an off state.

Figure 4B:
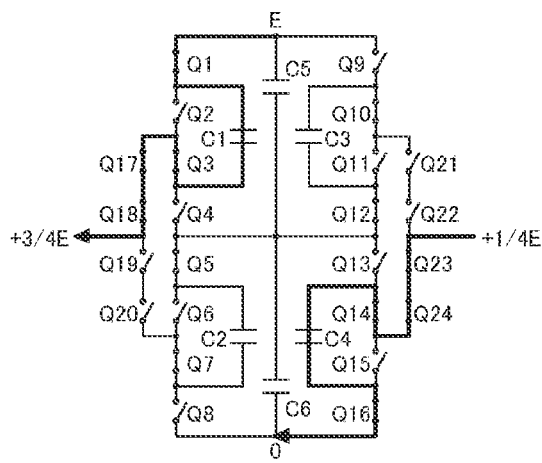

When, as shown in FIG. 4B, +½E is output from the inverter circuit 10 while the first flying capacitor C1 and the fourth flying capacitor C4 are being charged by the DC power supply 2, the control unit 30 controls the first switching element Q1, the third switching element Q3, the fifth switching element Q5, the seventh switching element Q7, the tenth switching element Q10, the twelfth switching element Q12, the fourteenth switching element Q14, the sixteenth switching element Q16, the seventeenth switching element Q17, the eighteenth switching element Q18, the twenty-third switching element Q23, and the twenty-fourth switching element Q24 to be in an on state and controls the second switching element Q2, the fourth switching element Q4, the sixth switching element Q6, the eighth switching element Q8, the ninth switching element Q9, the eleventh switching element Q11, the thirteenth switching element Q13, the fifteenth switching element Q15, the nineteenth switching element Q19, the twentieth switching element Q20, the twenty-first switching element Q21, and the twenty-second switching element Q22 to be in an off state.

Figure 4C:
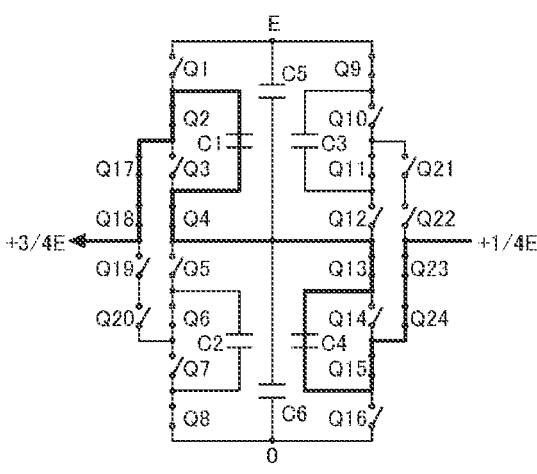

When, as shown in FIG. 4C, +½E is output from the inverter circuit 10 while the first flying capacitor C1 and the fourth flying capacitor C4 are discharged to the grid 3, the control unit 30 controls the second switching element Q2, the fourth switching element Q4, the sixth switching element Q6, the eighth switching element Q8, the ninth switching element Q9, the eleventh switching element Q11, the thirteenth switching element Q13, the fifteenth switching element Q15, the seventeenth switching element Q17, the eighteenth switching element Q18, the twenty-third switching element Q23, and the twenty-fourth switching element Q24 in an on state and controls the first switching element Q1, the third switching element Q3, the fifth switching element Q5, the seventh switching element Q7, the tenth switching element Q10, the twelfth switching element Q12, the fourteenth switching element Q14, the sixteenth switching element Q16, the nineteenth switching element Q19, the twentieth switching element Q20, the twenty-first switching element Q21, and the twenty-second switching element Q22 to be in an off state.

The control unit 30 can cause the inverter circuit 10 to output +½E by repeating the switching pattern shown in FIG. 4B and the switching pattern shown in FIG. 4C alternately.

Figure 4D:
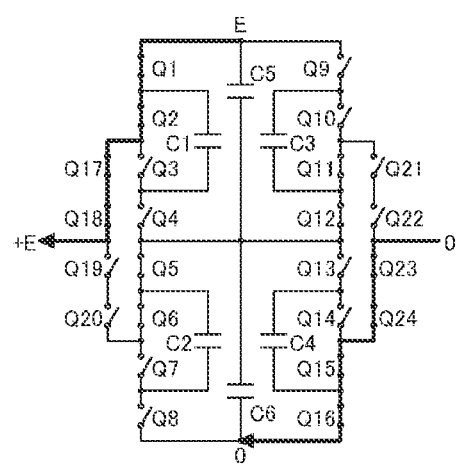

When, as shown in FIG. 4D, +E is output from the inverter circuit 10, the control unit 30 controls the first switching element Q1, the second switching element Q2, the fifth switching element Q5, the sixth switching element Q6, the eleventh switching element Q11, the twelfth switching element Q12, the fifteenth switching element Q15, the sixteenth switching element Q16, the seventeenth switching element Q17, the eighteenth switching element Q18, the twenty-third switching element Q23, and the twenty-fourth switching element Q24 to be in an on state and controls the third switching element Q3, the fourth switching element Q4, the seventh switching element Q7, the eighth switching element Q8, the ninth switching element Q9, the tenth switching element Q10, the thirteenth switching element Q13, the fourteenth switching element Q14, the nineteenth switching element Q19, the twentieth switching element Q20, the twenty-first switching element Q21, and the twenty-second switching element Q22 to be in an off state.

Figure 5A:
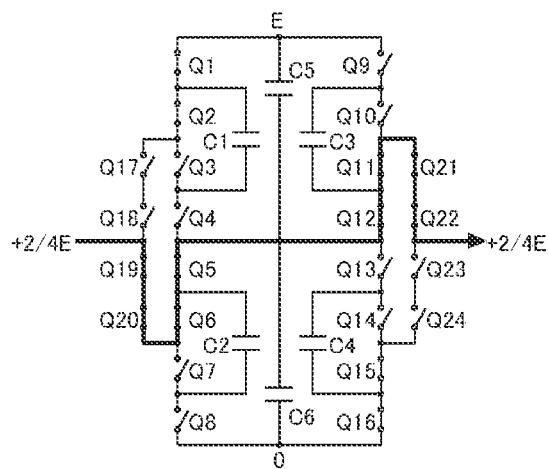
FIGS. 5A-5D are circuit diagrams representing those of the switching patterns shown in FIG. 3 in the negative half cycle.

When, as shown in FIG. 5A, −0 is output from the inverter circuit 10, the control unit 30 controls the first switching element Q1, the second switching element Q2, the fifth switching element Q5, the sixth switching element Q6, the eleventh switching element Q11, the twelfth switching element Q12, the fifteenth switching element Q15, the sixteenth switching element Q16, the nineteenth switching element Q19, the twentieth switching element Q20, the twenty-first switching element Q21, and the twenty-second switching element Q22 to be in an on state and controls the third switching element Q3, the fourth switching element Q4, the seventh switching element Q7, the eighth switching element Q8, the ninth switching element Q9, the tenth switching element Q10, the thirteenth switching element Q13, the fourteenth switching element Q14, the seventeenth switching element Q17, the eighteenth switching element Q18, the twenty-third switching element Q23, and the twenty-fourth switching element Q24 to be in an off state.

Figure 5B:
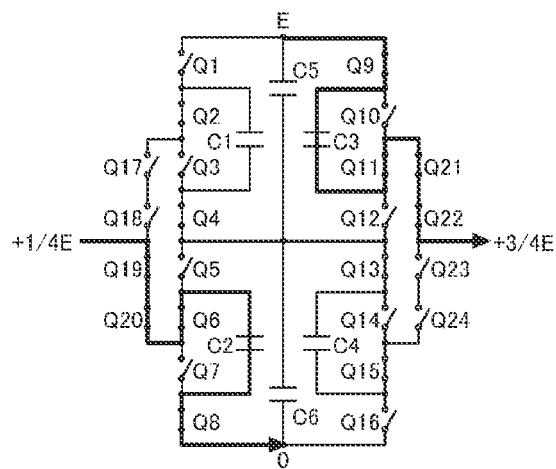

When, as shown in FIG. 5B, −½E is output from the inverter circuit 10 while the second flying capacitor C2 and the third flying capacitor C3 are being charged by the DC power supply 2, the control unit 30 controls the second switching element Q2, the fourth switching element Q4, the sixth switching element Q6, the eighth switching element Q8, the ninth switching element Q9, the eleventh switching element Q11, the thirteenth switching element Q13, the fifteenth switching element Q15, the nineteenth switching element Q19, the twentieth switching element Q20, the twenty-first switching element Q21, and the twenty-second switching element Q22 to be in an on state and controls the first switching element Q1, the third switching element Q3, the fifth switching element Q5, the seventh switching element Q7, the tenth switching element Q10, the twelfth switching element Q12, the fourteenth switching element Q14, the sixteenth switching element Q16, the seventeenth switching element Q17, the eighteenth switching element Q18, the twenty-third switching element Q23, and the twenty-fourth switching element Q24 to be in an off state.

Figure 5C:
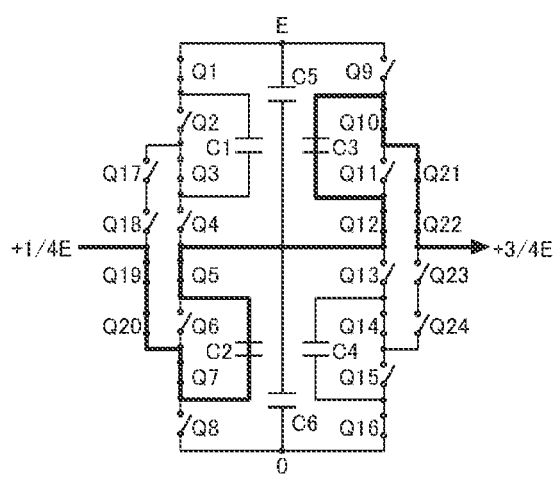

When, as shown in FIG. 5C, −½E is output from the inverter circuit 10 while the second flying capacitor C2 and the third flying capacitor C3 are discharged to the grid 3, the control unit 30 controls the first switching element Q1, the third switching element Q3, the fifth switching element Q5, the seventh switching element Q7, the tenth switching element Q10, the twelfth switching element Q12, the fourteenth switching element Q14, the sixteenth switching element Q16, the nineteenth switching element Q19, the twentieth switching element Q20, the twenty-first switching element Q21, and the twenty-second switching element Q22 to be in an on state and controls the second switching element Q2, the fourth switching element Q4, the sixth switching element Q6, the eighth switching element Q8, the ninth switching element Q9, the eleventh switching element Q11, the thirteenth switching element Q13, the fifteenth switching element Q15, the seventeenth switching element Q17, the eighteenth switching element Q18, the twenty-third switching element Q23, and the twenty-fourth switching element Q24 to be in an off state.

The control unit 30 can cause the inverter circuit 10 to output −½E by repeating the switching pattern shown in FIG. 5B and the switching pattern shown in FIG. 5C alternately.

Figure 5D:
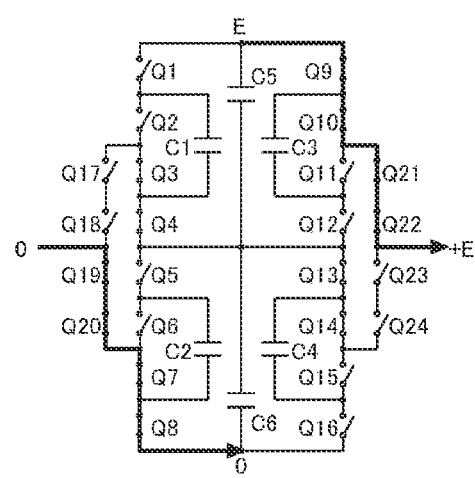

When, as shown in FIG. 5D, −E is output from the inverter circuit 10, the control unit 30 controls the third switching element Q3, the fourth switching element Q4, the seventh switching element Q7, the eighth switching element Q8, the ninth switching element Q9, the tenth switching element Q10, the thirteenth switching element Q13, the fourteenth switching element Q14, the nineteenth switching element Q19, the twentieth switching element Q20, the twenty-first switching element Q21, and the twenty-second switching element Q22 to be in an on state and controls the first switching element Q1, the second switching element Q2, the fifth switching element Q5, the sixth switching element Q6, the eleventh switching element Q11, the twelfth switching element Q12, the fifteenth switching element Q15, the sixteenth switching element Q16, the seventeenth switching element Q17, the eighteenth switching element Q18, the twenty-third switching element Q23, and the twenty-fourth switching element Q24 to be in an off state.

As described above, an N-channel MOSFET having a withstand voltage of 150V is used as the first switching element Q1-the twenty-fourth switching element Q24. Hereinafter, the protection function of the first switching element Q1-the twenty-fourth switching element will be described. In the embodiment, the function of protecting the first switching element Q1-the sixteenth switching element Q16 forming the multilevel output unit will be highlighted.

The second switching element Q2 and the third switching element Q3 connected inside the ends of the first flying capacitor C1 are in a complementary relationship. Therefore, the voltage of the first flying capacitor C1 is always applied to one of the second switching element Q2 and the third switching element Q3 except during the dead time. When the measured voltage of the first flying capacitor C1 exceeds a preset threshold value (e.g., (150V—margin voltage)), the control unit 30 suspends the operation of the inverter circuit 10 to protect the second switching element Q2 or the third switching element Q3.

Further, the first switching element Q1 and the fourth switching element Q4 connected outside the ends of the first flying capacitor C1 are in a complementary relationship. Therefore, a differential voltage derived from subtracting the voltage of the first flying capacitor C1 from the voltage between the positive-side bus and the intermediate wiring is always applied to one of the first switching element Q1 and the fourth switching element Q4 except during the dead time. When the differential voltage exceeds a preset threshold value (e.g., (150V—margin voltage)), the control unit 30 suspends the operation of the inverter circuit 10 to protect the first switching element Q1 or the fourth switching element Q4.

The inverter circuit 10 is suspended by opening a parallel-off relay (not shown) provided between the power converter 1 and the grid 3. This stops a current from flowing in the power converter 1.

Figure 6:
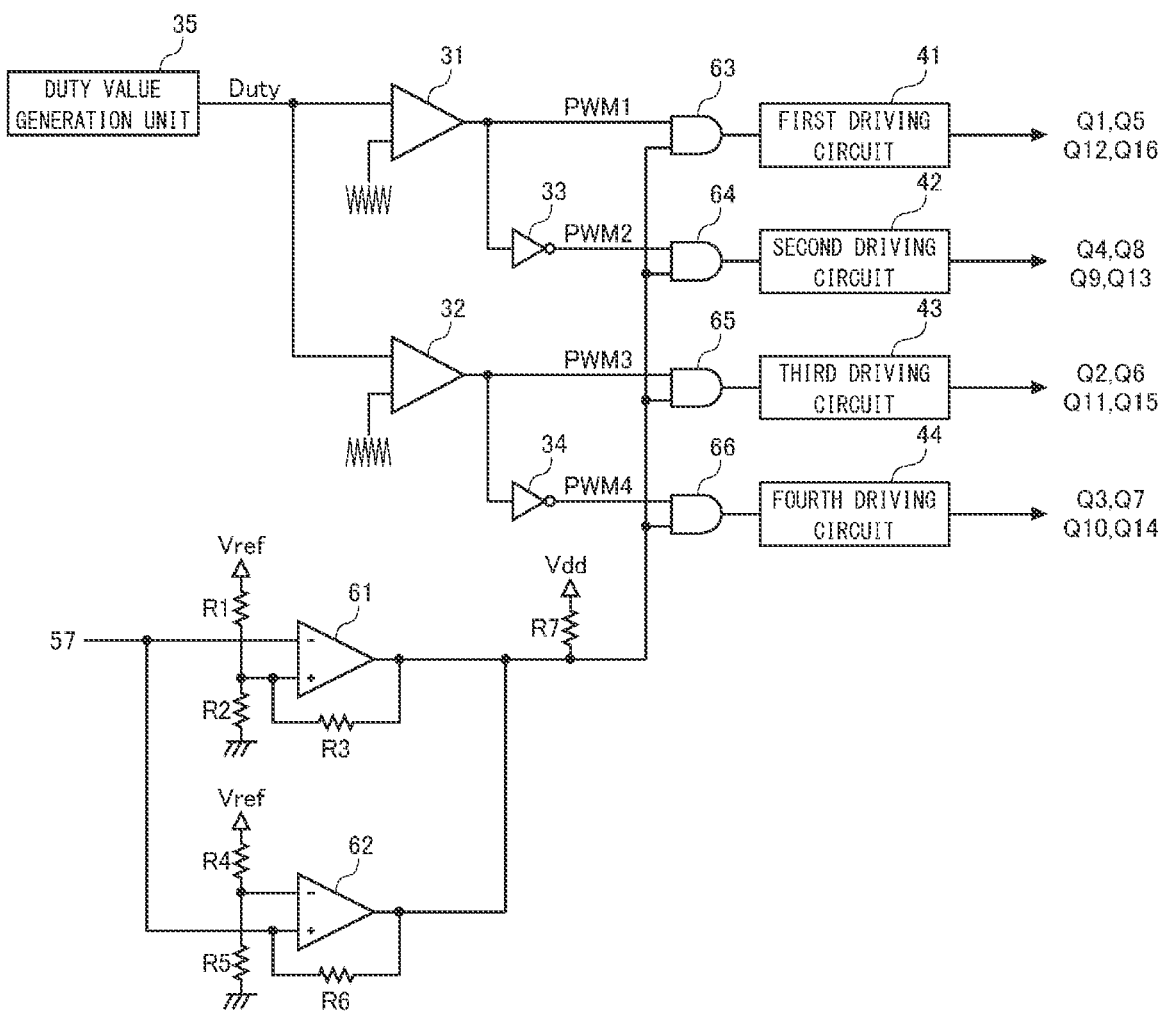
FIG. 6 shows an exemplary configuration 1 of the control unit, the driving circuit, and the excess current protection circuit.

FIG. 6 shows an exemplary configuration 1 of the control unit 30, the driving circuit 40, and the excess current protection circuit 60. The driving circuit 40 includes a first driving circuit 41, a second driving circuit 42, a third driving circuit 43, and a fourth driving circuit 44. The first driving circuit 41 turns the first switching element Q1, the fifth switching element Q5, the twelfth switching element Q12, and the sixteenth switching element Q16 on/off, based on a PWM1 signal. The second driving circuit 42 turns the fourth switching element Q4, the eighth switching element Q8, the ninth switching element Q9, and the thirteenth switching element Q13 on/off, based on a PWM2 signal. The third driving circuit 43 turns the second switching element Q2, the sixth switching element Q6, the eleventh switching element Q11, and the fifteenth switching element Q15 on/off, based on a PWM3 signal. The fourth driving circuit 44 turns the third switching element Q3, the seventh switching element Q7, the tenth switching element Q10, and the fourteenth switching element Q14 on/off, based on a PWM4 signal.

In the exemplary configuration 1, the control unit 30 includes a duty value generation unit 35, a first comparator 31, a second comparator 32, a first NOT circuit 33, and a second NOT circuit 34. The duty value generation unit 35 calculates a deviation of the current value measured by the output current measurement unit 59 from the target current value. The duty value generation unit 35 generates a current command value by PI compensation or P compensation, based on the calculated deviation. When the measured current value is smaller than the target current value, the duty value is controlled to be raised. When the measured current value is larger than the target current value, the duty value is controlled to be lowered. The current value subject to control may be the current value measured by the reactor current measurement unit 57 instead of the current value measured by the output current measurement unit 59. The duty value generated by the duty value generation unit 35 is input to the first input terminals of the first comparator 31 and the second comparator 32.

The value of the first carrier wave is input to the second input terminal of the first comparator 31. In the embodiment, a triangular wave is used as the carrier wave. The value of the second carrier wave having a phase shifted from the first carrier wave by a half cycle (180°) is input to the second input terminal of the second comparator 32.

The first comparator 31 compares the duty value input from the duty value generation unit 35 with the value of the first carrier wave and outputs a result of comparison as the PWM1 signal. The first NOT circuit 33 inverts the PWM1 signal and outputs the PWM2 signal having a phase opposite to that of the PWM1 signal. In this specification, dead band is neglected for brevity.

The second comparator 32 compares the duty value input from the duty value generation unit 35 with the value of the second carrier wave and outputs a result of comparison as the PWM3 signal. The second NOT circuit 34 inverts the PWM3 signal and outputs the PWM4 signal having a phase opposite to that of the PWM3 signal.

The excess current protection circuit 60 includes a positive-side hysteresis comparator for detecting a positive excess current, a negative-side hysteresis comparator for detecting a negative excess current, a first AND circuit 63, a second AND circuit 64, a third AND circuit 65, and a fourth AND circuit 66.

The positive-side hysteresis comparator includes a first operational amplifier 61, a first resistor R1, a second resistor R2, and a third resistor R3. The value measured by the reactor current measurement unit 57 and indicating the current flowing in the first reactor L1 is input to the inverting input terminal of the first operational amplifier 61. A reference threshold value is input to the non-inverting input terminal of the first operational amplifier 61. The reference threshold value is generated by dividing the reference voltage Vref by the first resistor R1 and the second resistor R2. A positive feedback path in which the third resistor R3 is inserted connects between the output terminal and the non-inverting input terminal of the first operational amplifier 61.

When a positive feedback circuit via the third resistor R3 does not connect between the output terminal and the non-inverting input terminal of the first operational amplifier 61, a normal comparator results. In that case, the comparator outputs a high level when the value Vin indicating the current flowing in the first reactor L1 is lower than the reference threshold value and outputs a low level when Vin is higher than the reference threshold value. When the output of the comparator is a low level, it means that an excess current in the positive direction is flowing in the first reactor L1.

Figure 7:
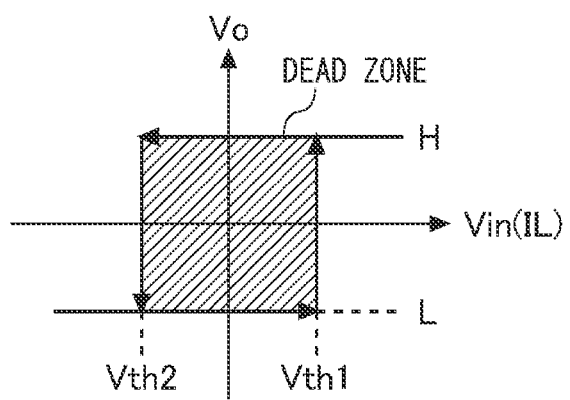
FIG. 7 illustrates a reference threshold value of the hysteresis comparator.

FIG. 7 illustrates a reference threshold value of the hysteresis comparator. The hysteresis comparator is a comparator in which the output is not inverted in a certain voltage range (hereinafter, referred to as a dead zone). The upper limit voltage of the dead zone has the upper reference threshold value Vth1, and the lower limit voltage has the lower reference threshold value Vth2. When the hysteresis comparator outputs a high level, the reference threshold value is the upper reference threshold value Vth1. When the hysteresis comparator outputs a low level, the reference threshold value is the lower reference threshold value Vth2.

The breadth of the dead zone can be adjusted by the value of the reference voltage Vref, the value of the first resistor R1, the value of the second resistor R2, and the value of the third resistor R3. The smaller the value of the third resistor R3 set, the larger the breadth of the dead zone. By using the hysteresis comparator, chattering near the reference threshold value for detecting an excess current can be prevented.

When the value Vin indicating the current flowing in the first reactor L1 exceeds the upper reference threshold value Vth1 while the positive-side hysteresis comparator shown in FIG. 6 is outputting a high level, the hysteresis comparator inverts the output to a low level. In the positive-side hysteresis comparator, the upper reference threshold value Vth1 will be the threshold value for detecting an excess current flowing in the positive direction. When the value Vin indicating the current flowing in the first reactor L1 falls below the lower reference threshold value Vth2 while the positive-side hysteresis comparator is outputting a low level, the positive-side hysteresis comparator inverts the output to a high level.

The negative-side hysteresis comparator includes a second operational amplifier 62, a fourth resistor R4, a fifth resistor R5, and a sixth resistor R6. The value measured by the reactor current measurement unit 57 and indicating the current flowing in the first reactor L1 is input to the non-inverting input terminal of the second operational amplifier 62. A reference threshold value is input to the non-inverting input terminal of the second operational amplifier 62. The reference threshold value is generated by dividing the reference voltage Vref by the fourth resistor R4 and the fifth resistor R5. A positive feedback path in which the sixth resistor R6 is inserted connects between the output terminal and the non-inverting input terminal of the second operational amplifier 62.

When the value Vin indicating the current flowing in the first reactor L1 falls below the lower reference threshold value Vth2 while the negative-side hysteresis comparator is outputting a high level, the hysteresis comparator inverts the output to a low level. In the negative-side hysteresis comparator, the lower reference threshold value Vth2 will be the threshold value for detecting an excess current flowing in the negative direction. When the value Vin indicating the current flowing in the first reactor L1 exceeds the upper reference threshold value Vth1 while the negative-side hysteresis comparator is outputting a low level, the negative-side hysteresis comparator inverts the output to a high level.

The output terminal of the positive-side hysteresis comparator and the output terminal of the negative-side hysteresis comparator are coupled. The coupled output terminals are pulled up to the power supply voltage Vdd (high level) via the seventh resistor R7. The level at the output terminals is a low level when an excess current is flowing in the positive direction (when the output of the positive-side hysteresis comparator is a low level) or when an excess current is flowing in the negative direction (when the output of the negative-side hysteresis comparator is a low level) and is a high level otherwise. In other words, when the level of the output terminals (hereinafter, referred to as the output level of the hysteresis comparators) is a high level, it means that the current flowing in the first reactor L1 is normal. When the level is a low level, it means that the current flowing in the first reactor L1 is abnormal.

The PWM1 signal is input to the first input terminal of the first AND circuit 63, and the output level of the hysteresis comparators is input to the second input terminal. The first AND circuit 63 outputs the PWM1 signal directly to the first driving circuit 41 when the output level of the hysteresis comparators is a high level and outputs a low level (an off signal) to the first driving circuit 41 when the output level of the hysteresis comparators is a low level.

The PWM2 signal is input to the first input terminal of the second AND circuit 64, and the output level of the hysteresis comparators is input to the second input terminal. The second AND circuit 64 outputs the PWM2 signal directly to the second driving circuit 42 when the output level of the hysteresis comparators is a high level and outputs a low level (an off signal) to the second driving circuit 42 when the output level of the hysteresis comparators is a low level.

The PWM3 signal is input to the first input terminal of the third AND circuit 65, and the output level of the hysteresis comparators is input to the second input terminal. The third AND circuit 65 outputs the PWM3 signal directly to the third driving circuit 43 when the output level of the hysteresis comparators is a high level and outputs a low level (an off signal) to the third driving circuit 43 when the output level of the hysteresis comparators is a low level.

The PWM4 signal is input to the first input terminal of the fourth AND circuit 66, and the output level of the hysteresis comparators is input to the second input terminal. The fourth AND circuit 66 outputs the PWM4 signal directly to the fourth driving circuit 44 when the output level of the hysteresis comparators is a high level and outputs a low level (an off signal) to the fourth driving circuit 44 when the output level of the hysteresis comparators is a low level.

The driving circuit for driving the seventeenth switching element Q17-the twenty-fourth switching element Q24 is omitted in FIG. 6. A low level (an off signal) is also input to that driving circuit when the output level of the hysteresis comparators is a low level.

In the exemplary configuration 1, the output level of the hysteresis comparators will be a low level when an excess current flows in the first reactor L1, and the driving circuit 40 will output an off signal to the gate terminals of the first switching element Q1-the twenty-fourth switching element Q24. This can induce a gate block state while the power converter 1 maintains electrical connection with the grid 3.

Figure 8:
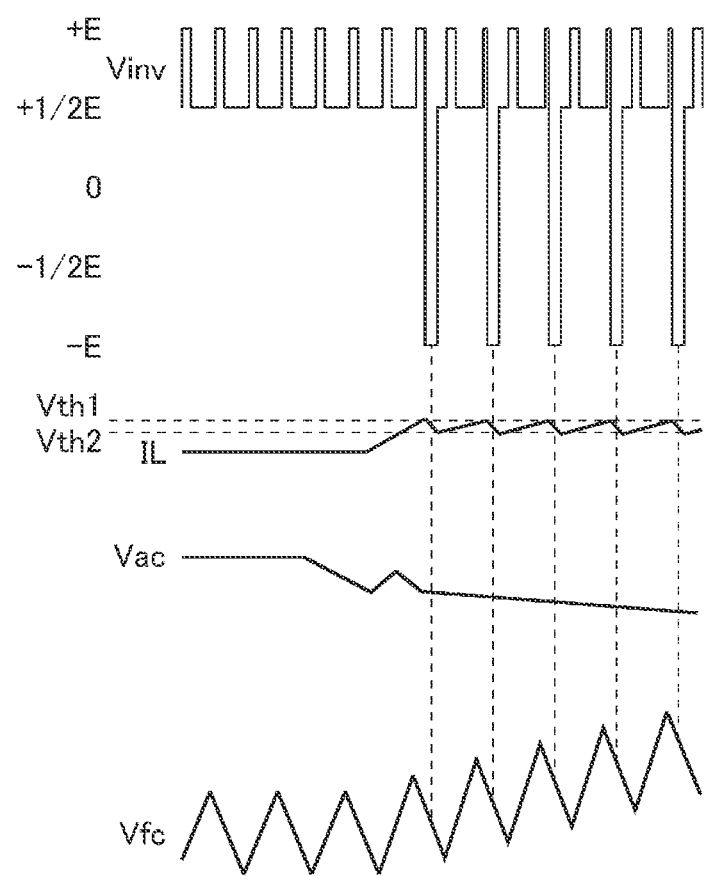
FIG. 8 shows a waveform obtained by a first simulation test of the FRT requirement of the power converter in which the exemplary configuration 1 is used.

FIG. 8 shows a waveform obtained by a first simulation test of the FRT requirement of the power converter 1 in which the exemplary configuration 1 is used. The waveform shown in FIG. 8 represents a schematic waveform transformed from the actual waveform obtained by the simulation test. The inverter circuit 10 alternately outputs +E and +½E as the five-level output voltage Vin. When the inverter circuit 10 outputs +½E, the flying capacitors C1-C4 alternately repeat charging and discharging at a ratio 1:1 so that the voltage Vfc of the flying capacitors C1-C4 varies periodically within a certain range.

When the grid voltage Vac drops due to a disturbance in the grid 3, the inductor current IL rises. When the value of the inductor current IL exceeds the upper reference threshold value Vth1, the excess current protection circuit 60 is turned on, and the first switching element Q1-the twenty-fourth switching element Q24 are turned off. In this state, the path of the eighteenth diode D18, the seventeenth diode D17, the second diode D2, the first diode D1, the DC power supply 2, the sixteenth diode D16, the fifteenth diode D15, the twenty-fourth diode D24, and the twenty-third diode D23 conducts electricity, and −E is output from the inverter circuit 10. During a period in which the excess current protection circuit 60 is turned on, the inductor current IL drops. During a period in which −E is output from the inverter circuit 10, the current does not flow in the flying capacitors C1-C4, and the flying capacitors C1-C4 are neither charged nor discharged. When the value of the inductor current I1 falls below the lower reference threshold value Vth2, the excess current protection circuit 60 is turned off, and normal five-level output control is resumed.

The test result shown in FIG. 8 reveals that the excess current protection circuit 60 is turned on when the flying capacitors C1-C4 are discharged, and the excess current protection circuit 60 is turned off when the flying capacitors C1-C4 are charged, which steps are repeated. This reduces the time in which the flying capacitors C1-C4 are discharged, causing the amount of charge to be larger than the amount of discharge and raising the voltage Vfc of the flying capacitors C1-C4. In this test, the voltage Vfc of the flying capacitors C1-C4 subsequently reached the excess voltage threshold value, and the operation of the inverter circuit 10 was suspended. In order to meet the FRT requirement, it is necessary that the operation of the inverter circuit 10 is not suspended due to an excess voltage or an insufficient voltage of the flying capacitors C1-C4 in the event of a disturbance in the grid 3.

In the first counter measure to prevent the operation of the inverter circuit 10 from being suspended in the event of a disturbance in the grid 3, the breadth of the dead zone of the hysteresis comparators is extended. Specifically, the lower reference threshold value Vth2 of the positive-side hysteresis comparator is set to be lower than an ordinary threshold by a certain value or larger, and the upper reference threshold value Vth1 of the negative-side hysteresis comparator is set to be higher than an ordinary threshold value by a certain value or larger. In the positive-side hysteresis comparator used in the simulation test shown in FIG. 8, for example, the upper reference threshold value Vth1 is set to be a value corresponding to a current between 50 A and 60 A and the lower reference threshold value Vth 2 is set to be a value corresponding to a current between 40 A and 50 A. In the first counter measure, the lower reference threshold value Vth2 is set to be a value corresponding to a current near 10 A.

Figure 9:
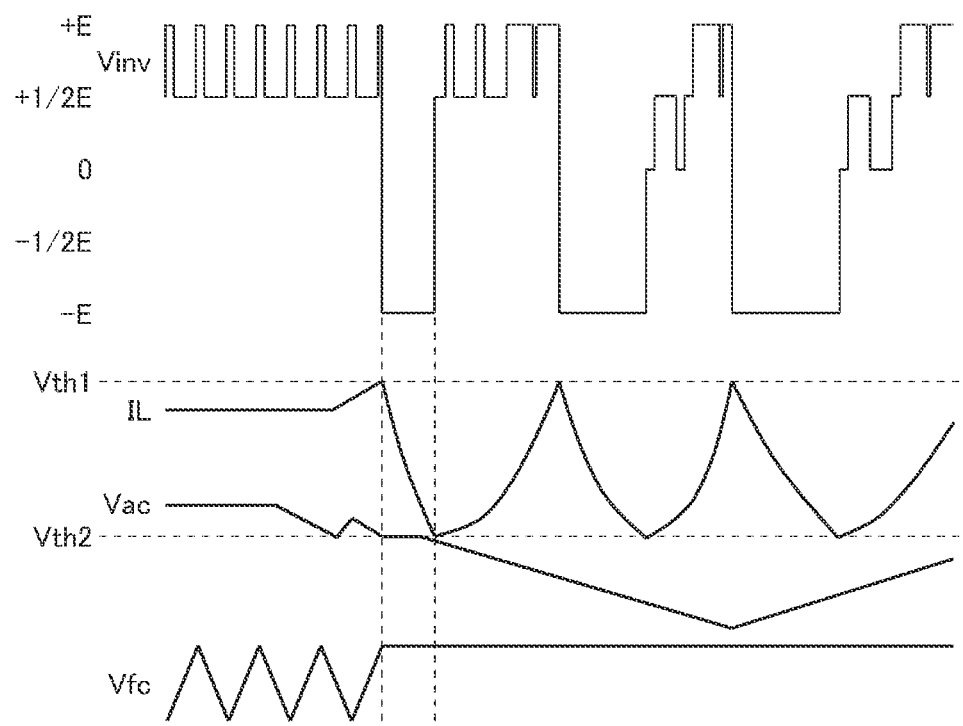
FIG. 9 shows a waveform obtained by a second simulation test of the FRT requirement of the power converter in which the exemplary configuration 1 is used.

FIG. 9 shows a waveform obtained by a second simulation test of the FRT requirement of the power converter 1 in which the exemplary configuration 1 is used. The second simulation was conducted after the first counter measure is applied. When the grid voltage Vac drops due to a disturbance in the grid 3, the inductor current IL rises. When the value of the inductor current IL exceeds the upper reference threshold value Vth1, the excess current protection circuit 60 is turned on, and −E is output from the inverter circuit 10 as described above. During a period in which the excess current protection circuit 60 is turned on, the inductor current IL drops.

In the example of FIG. 9, the value of the inductor current I1 drops to a value smaller than the target current value. In other words, the dead zone of the positive-side hysteresis comparator is set to have a breadth that ensures that the value of the inductor current IL drops to a value smaller than the target current value. This ensures that, at least, the value of the inductor current IL is smaller than target current value so that the excess current protection circuit 60 will continue to supply an off signal to the first driving circuit 41-the fourth driving circuit 44.

In the second simulation test, the lower reference threshold value Vth2 is set to be small so that the value of the inductor current IL drops to a value smaller than the target current value. When the value of the inductor current IL falls below the lower reference threshold value Vth2, the excess current protection circuit 60 is turned off, and normal five-level output control is resumed. In a zone when +½E is output immediately after normal five-level output control is resumed, the value of the current is small so that the amount of charge or the amount of discharge of the flying capacitors C1-C4 will be small. Further, since the value of the current is small, the deviation of the measured current value from the target current value is large. When feedback control begins to take effect, therefore, the control unit 30 controls the inverter circuit 10 to output +E so that the deviation approaches 0.

Conversely, when an excess current in the negative direction is detected by the excess current protection circuit 60 as flowing and when the value of the inductor current IL falls below the lower reference threshold value Vth2, the excess current protection circuit 60 is turned on, and +E is output from the inverter circuit 10. During a period in which the excess current protection circuit 60 is turned on, the inductor current IL rises. When the value of the inductor current IL exceeds the upper reference threshold value Vth1, the excess current protection circuit 60 is turned off, and the first switching element Q1-the twenty-fourth switching element Q24 return to normal five-level output control. When feedback control begins to take effect, the control unit 30 controls the inverter circuit 10 to output −E to cause the deviation to approach 0.

In the switching patterns as shown in FIG. 4A and FIG. 5A in which the inverter circuit 10 outputs +E or −E, the current does not flow in the flying capacitors C1-C4, and the flying capacitors C1-C4 are neither charged nor discharged. In the second simulation test, the voltage Vfc of the flying capacitors C1-C4 does not rise and remains stable even if an excess current flows due to a disturbance in the grid 3, as shown in FIG. 9. Therefore, suspension of the operation of the inverter circuit 10 due to the voltage Vfc of one of the flying capacitors C1-C4 rising and reaching the excess voltage threshold value can be avoided.

Figure 10:
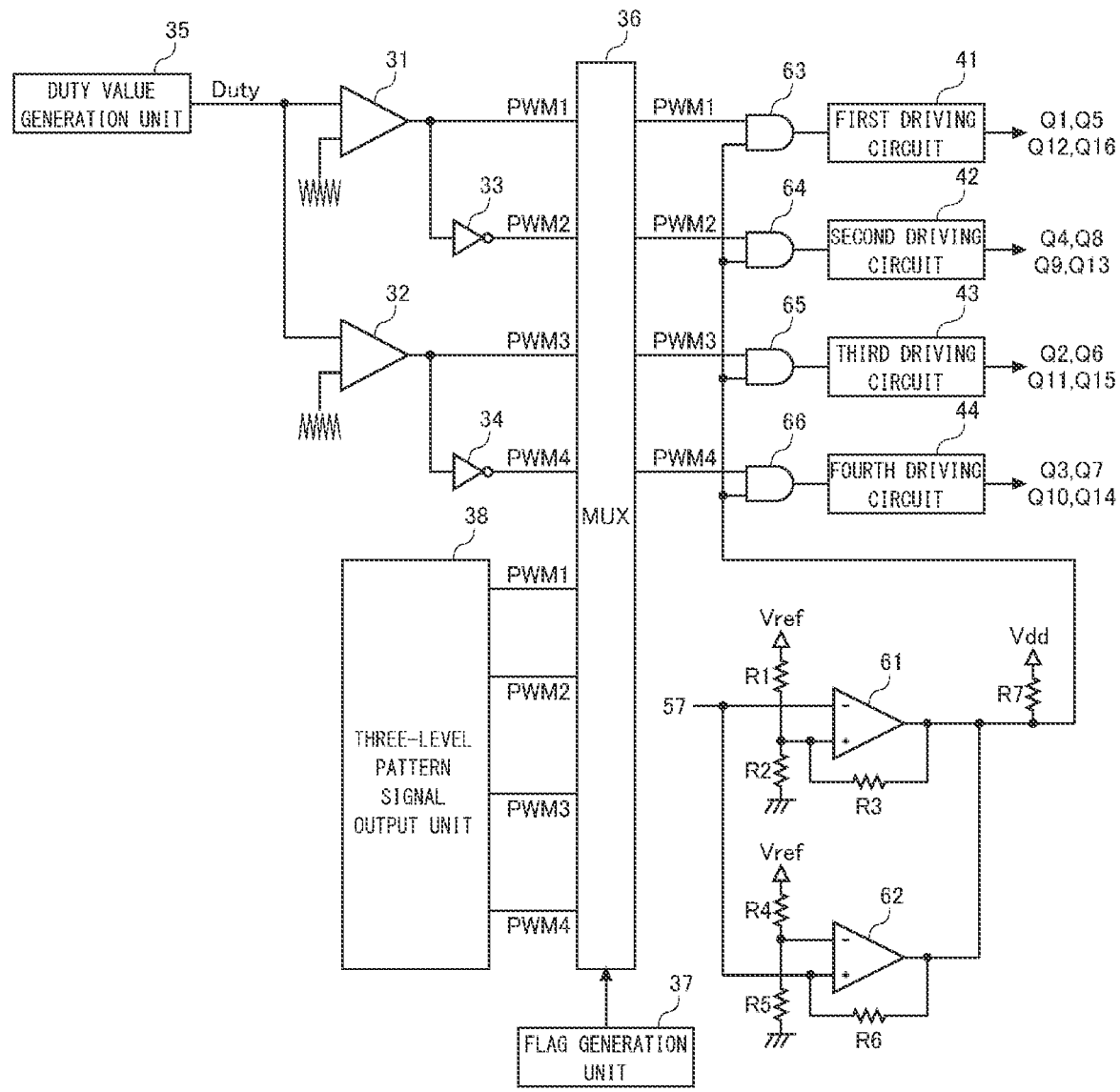
FIG. 10 shows an exemplary configuration 2 of the control unit, the driving circuit, and the excess current protection circuit.

FIG. 10 shows an exemplary configuration 2 of the control unit 30, the driving circuit 40, and the excess current protection circuit 60. The exemplary configuration 2 is a configuration for implementing the second counter measure for avoiding suspension of operation of the inverter circuit 10 in the event of a disturbance in the grid 3. In the second-fourth counter measures described below, the dead zone of the hysteresis comparators is set to be a normal breadth. A dead zone having a breadth wider than normal may be set equally in the second-fourth counter measures, as described in the first counter measure.

As compared with the exemplary configuration 1 shown in FIG. 6, the control unit 30 in the exemplary configuration 2 further includes a multiplexer 36, a flag generation unit 37, and a three-level pattern signal output unit 38. The three-level pattern signal output unit 38 generates a PWM signal for causing the inverter circuit 10 to output an AC voltage generated by voltage at three levels +E, 0, −E.

The three-level pattern signal output unit 38 does not use the switching patterns shown in FIG. 4B, FIG. 4C, FIG. 5B, FIG. 5C that cause the inverter circuit 10 to output +½E, −½E and only uses the switching patterns shown in FIG. 4A, FIG. 4D, FIG. 5A, FIG. 5D for outputting +0, +E, −0, −E. In the latter switching patterns, the current does not flow in the flying capacitors C1-C4, and the flying capacitors C1-C4 are neither charged nor discharged.

Figure 11:
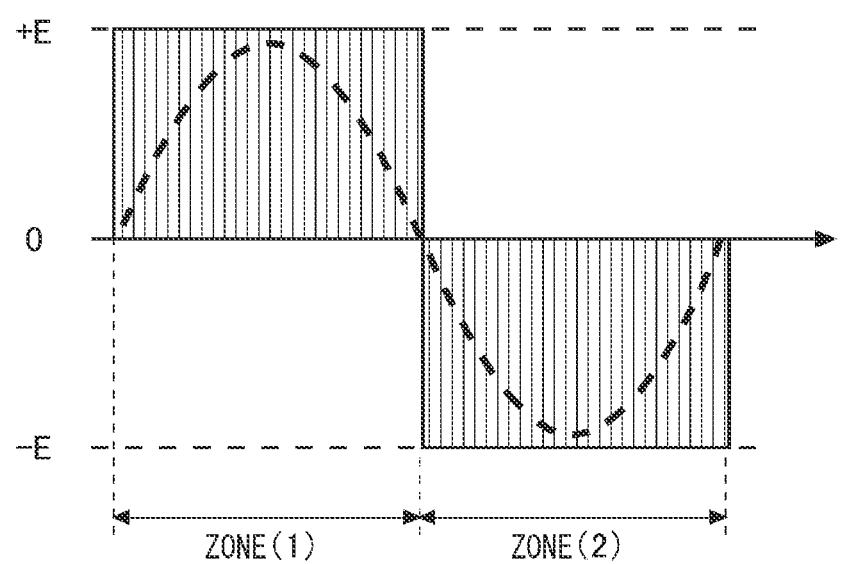
FIG. 11 shows an AC wave generated by a voltage at three levels (+E, 0, −E)

FIG. 11 shows an AC wave generated by a voltage at three levels (+E, 0, −E). In a zone (1), +E and 0 are alternately output, and, in a zone (2), 0 and −E are alternately output. This generates an AC wave for one period. The AC wave shown in FIG. 11 is a rectangular AC wave centered around 0. As compared with the pseudo sinusoidal wave shown in FIG. 2 generated by voltage at five levels (+E, +½E, 0, −½E, −E), deviation from the grid voltage is larger, and the conversion efficiency is lower.

Reference is made back to FIG. 10. The three-level pattern signal output unit 38 generates the PWM1 signal-the PWM4 signal for causing the inverter circuit 10 to output the AC wave shown in FIG. 11 and outputs the signals to the multiplexer 36.

Also input to the multiplexer 36 are the PWM1 signal output from the first comparator, the PWM2 signal output from the first NOT circuit 33, the PWM3 signal output from the second comparator 32, and the PWM4 signal output from the second NOT circuit 34.

The flag generation unit 37 sets a significant flag in the multiplexer 36 during a period in which the voltage of one of the flying capacitors C1-C4 is abnormal (referred to as the first condition fulfillment period) and sets a non-significant flag in the multiplexer 36 during a period in which the voltages of all flying capacitors C1-C4 are normal. The state in which the voltage of one of the flying capacitors C1-C4 is abnormal means a state in which the voltage exceeds the excess voltage threshold value or falls below the insufficient voltage threshold value.

Further, the flag generation unit 37 may set a significant flag in the multiplexer 36 during a predetermined period (hereinafter, referred to as the second condition fulfillment period) since a drop in the instantaneous voltage of the grid 3 is detected and set a non-significant flag in the multiplexer 36 during the other periods. The predetermined period can be set arbitrarily by the designer. The flag generation unit 37 may also set a significant flag in the multiplexer 36 for a certain period since a rise in the instantaneous voltage of the grid 3 is detected.

Further, the flag generation unit 37 may set a significant flag in the multiplexer 36 in a period of time during which the first condition fulfillment period and the second condition fulfillment period overlap and set a non-significant flag in the multiplexer 36 during the other periods.

During a period in which a non-significant flag is set, the multiplexer 36 outputs the PWM1 signal-the PWM4 signal input from the first comparator 31 the first NOT circuit 33, the second comparator 32, and the second NOT circuit 34 to the first driving circuit 41-the fourth driving circuit 44, respectively. During a period in which a significant flag is set, the multiplexer 36 outputs the PWM1 signal-the PWM4 signal input from the three-level pattern signal output unit 38 to the first driving circuit 41-the fourth driving circuit 44, respectively.

In other words, the inverter circuit 10 operates as a three-level inverter during a period in which at least one of the first condition and the second condition is met and operates as a five-level inverter during the other periods. In the period during which the inverter circuit 10 operates as a three-level inverter, suspension of the inverter circuit 10 due to an excess voltage or an insufficient voltage of the flying capacitors C1-C4 is avoided.

When the inverter circuit 10 is caused to operate as a three-level inverter during a period in which both the first condition and the second condition are met, the FRT requirement is met, and, at the same time, the conversion efficiency is inhibited from dropping. The flying capacitors C1-C4 may not reach an excess voltage or an insufficient voltage even if a drop in the instantaneous voltage of the grid 3 occurs. In that case, it is originally possible for the inverter circuit 10 to continue to operate as a five-level inverter. If the inverter circuit 10 is switched, while the voltages of the flying capacitors C1-C4 remain within a normal range, to the operation of a three-level inverter in response to the fulfillment of only the second condition, the efficiency will be lowered as compared with the case in which the inverter circuit 10 continues to operate as a five-level converter.

Further, when the flying capacitors C1-C4 undergo an excessive voltage or an insufficient while a drop in the instantaneous voltage of the grid 3 is not occurring, it is preferred to suspend the operation of the inverter circuit 10 from the perspective of safety. If the inverter circuit 10 is switched to the operation of a three-level inverter in response to the fulfillment of only the first condition, the operation of the inverter circuit 10 will not be suspended and the inverter circuit 10 is only switched to the operation of a three-level inverter in response to an excess voltage or an insufficient voltage of the flying capacitors C1-C4, which is irrelevant to a drop in the instantaneous voltage of the grid 3.

Figure 12:
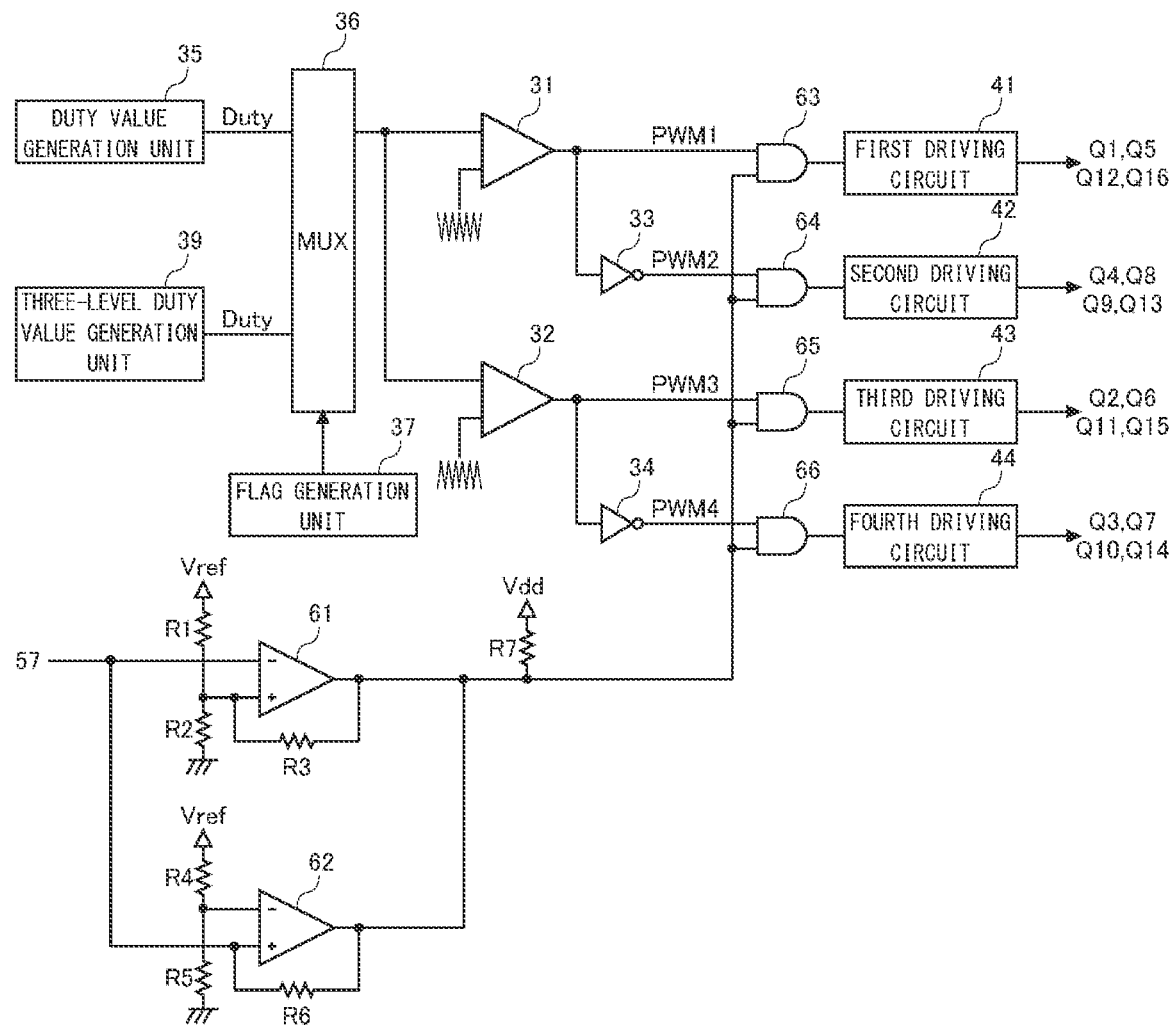
FIG. 12 shows an exemplary configuration 3 of the control unit, the driving circuit, and the excess protection circuit.

FIG. 12 shows an exemplary configuration 3 of the control unit 30, the driving circuit 40, and the excess protection circuit 60. The exemplary configuration 3 is a configuration for implementing the third counter measure for avoiding suspension of operation of the inverter circuit 10 in the event of a disturbance in the grid 3. As compared with the exemplary configuration 1 shown in FIG. 6, the control unit 30 of the exemplary configuration 3 further includes a multiplexer 36, a flag generation unit 37, and a three-level duty value generation unit 39. The three-level duty value generation unit 39 generates a duty value for causing the inverter circuit 10 to output an AC voltage generated by a voltage at three levels +E, 0, −E. To be more specific, the three-level duty value generation unit 39 generates a duty value for causing the inverter circuit 10 to output the AC wave shown in FIG. 11 and outputs the duty value for three levels to the multiplexer 36. The duty value for five levels generated by the five-level duty value generation unit 35 is also input to the multiplexer 36.

The flag generation unit 37 sets a significant or non-significant flag in the multiplexer 36 on the same condition as described in the exemplary configuration 2. During a period in which a non-significant flag is set, the multiplexer 36 outputs the duty value for five levels input from the duty value generation unit 35 to the first comparator 31 and the second comparator 32. During a period in which a significant flag is set, the multiplexer 36 outputs the duty value for three levels input from the three-level duty value generation unit 39 to the first comparator 31 and the second comparator 32.

In the exemplary configuration 3, as in the exemplary configuration 2, the inverter circuit 10 operates as a three-level inverter during a period in which at least one of the first condition and the second condition is met and operates as a five-level inverter during the other periods. In the period during which the inverter circuit 10 operates as a three-level inverter, suspension of the inverter circuit 10 due to an excess voltage or an insufficient voltage of the flying capacitors C1-C4 is avoided.

Figure 13:
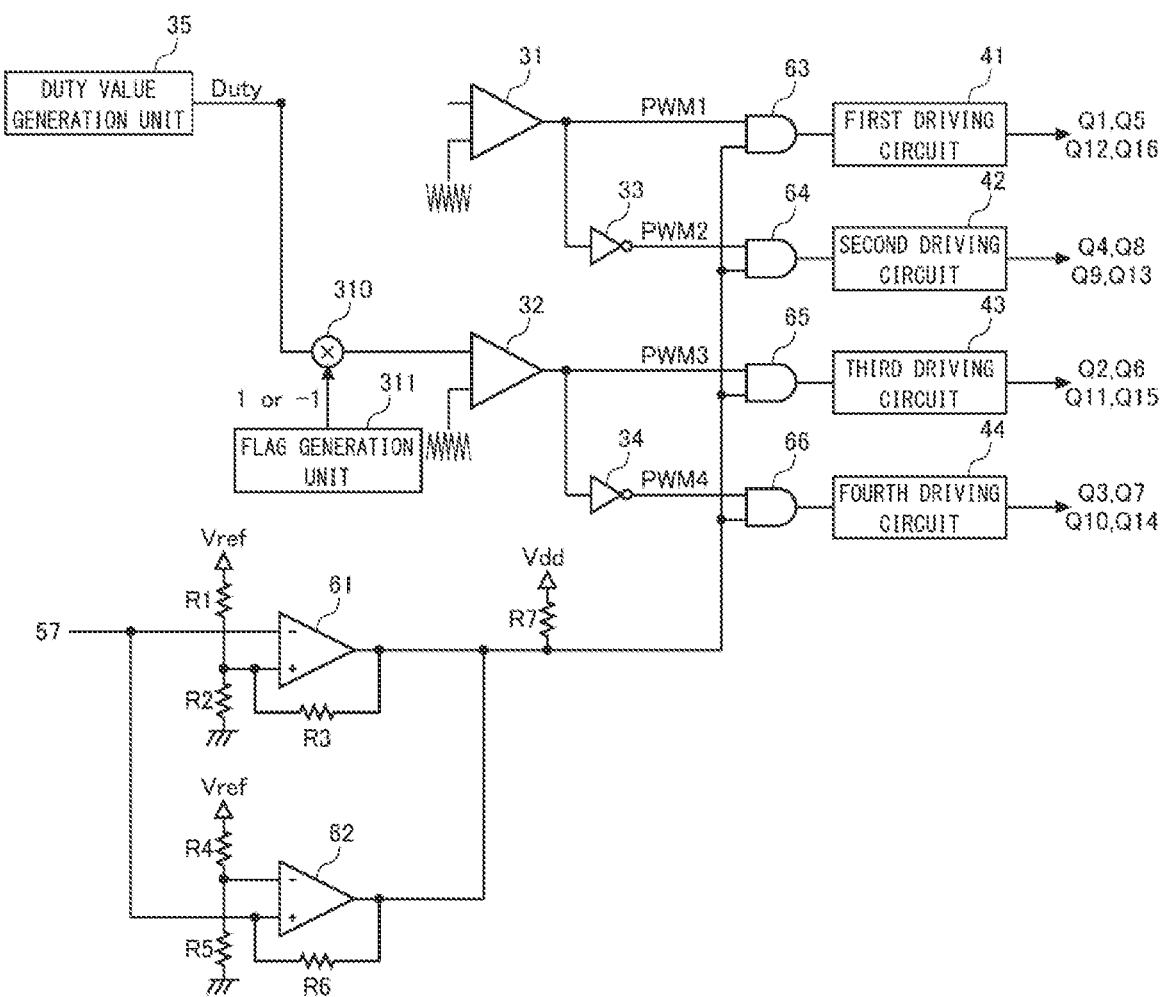
FIG. 13 shows an exemplary configuration of the control unit, the driving circuit, and the excess protection circuit.

FIG. 13 shows an exemplary configuration 4 of the control unit 30, the driving circuit 40, and the excess protection circuit 60. The exemplary configuration 4 is a configuration for implementing the fourth counter measure for avoiding suspension of operation of the inverter circuit 10 in the event of a disturbance in the grid 3. As compared with the exemplary configuration 1 shown in FIG. 6, the control unit 30 of the exemplary configuration 4 further includes a multiplier 310 and a flag generation unit 311. The flag generation unit 311 generates a significant or non-significant flag on the same condition as described in the exemplary configuration 2 and outputs the flag to the multiplier 310. In the exemplary configuration 4, the non-significant flag is 1, and the significant flag is −1.

The multiplier 310 multiplies the duty value output from the duty value generation unit 35 by the value of the flag output from the flag generation unit 311 and outputs the result to the first input terminal of the second comparator 32. When the flag generated by the flag generation unit 311 is non-significant, the multiplier 310 outputs the duty value output from the duty value generation unit 35 directly to the first input terminal of the second comparator 32. When the flag generated by the flag generation unit 311 is significant, the multiplier 310 inverts the polarity of the duty value output from the duty value generation unit 35 and outputs the inverted value to the first input terminal of the second comparator 32.

When the flag generated by the flag generation unit 311 is significant, the waveforms of the PWM1 signal and the PWM3 signal will be the same, and the waveforms of the PWM2 signal and the PWM4 signal will be the same. In that case, the switching pattern shown in FIG. 4B, FIG. 4C, FIG. 5B, FIG. 5C for outputting +½E, −½E is not used, and only the switching patterns shown in FIG. 4A, FIG. 4D, FIG. 5A, FIG. 5D for outputting +0, +E, −0, −E will be used.

The multiplier 310 may be provided before the second input terminal of the second comparator 32, before the first input terminal of the first comparator 31, or before the second input terminal of the first comparator 31 as well as before the the first input terminal of the second comparator 32. Whichever the location of provision, the waveforms of the PWM1 signal and the PWM3 signal will be the same, and the waveforms of the PWM2 signal and the PWM4 signal will be the same, when the flag generated by the flag generation unit 311 is significant.

In the exemplary configuration 4, as in the exemplary configuration 2, the inverter circuit 10 operates as a three-level inverter during a period in which at least one of the first condition and the second condition is met and operates as a five-level inverter during the other periods. During a period in which the inverter circuit 10 operates as a three-level inverter, the flying capacitors C1-C4 are neither charged nor discharged so that suspension of the inverter circuit 10 due to an excess voltage or an insufficient voltage of the flying capacitors C1-C4 is avoided.

According to the embodiment described above, the excess current protection circuit 60 is provided, and voltages other than +E, 0, −E are restricted from being output from the inverter circuit 10 during a period in which at least one one of conditions is met, i.e. when a voltage of the flying capacitors C1-C4 is abnormal or in the event of a disturbance in the grid 3. This prevents imbalance between charging and discharging of the flying capacitors C1-C4 without suspending the operation of the inverter circuit 10 when the instantaneous voltage of the grid 3 drops. Therefore, an excess voltage or an insufficient voltage of the flying capacitors C1-C4 is avoided and, at the same time, the FRE requirement can be met. Accordingly, non-compliance in the JET authentication test can be avoided. Further, the counter measures for excess current, excess voltage, insufficient voltage are sufficiently taken so that the elements are prevented from being broken due to a voltage in excess of the withstand voltage even if switching elements with a low withstand voltage are used. Using switching elements with a low withstand voltage contributes to realization of highly efficient and compact power converter 1.

Described above is an explanation of the present disclosure based on an exemplary embodiment. The embodiment is intended to be illustrative only and it will be understood by those skilled in the art that various modifications to combinations of constituting elements and processes are possible and that such modifications are also within the scope of the present disclosure.

The duty value generation unit 35, the first comparator 31, the second comparator 32, the first NOT circuit 33, and the second NOT circuit 34 in the exemplary configuration 1 shown in FIG. 6 can be realized by software arithmetic processing by a microcomputer. The duty value generation unit 35, the first comparator 31, the second comparator 32, the first NOT circuit 33, and the second NOT circuit 34, the multiplexer 36, the flag generation unit 37, and the three-level pattern signal output unit 38 in the exemplary configuration 2 shown in FIG. 10 can also be realized by software arithmetic processing by a microcomputer. The duty value generation unit 35, the first comparator 31, the second comparator 32, the first NOT circuit 33, and the second NOT circuit 34, the multiplexer 36, the flag generation unit 37, and the three-level duty value generation unit 39 in the exemplary configuration 3 shown in FIG. 12 can also be realized by software arithmetic processing by a microcomputer. The duty value generation unit 35, the first comparator 31, the second comparator 32, the first NOT circuit 33, and the second NOT circuit 34, the multiplier 310, and the flag generation unit 311 in the exemplary configuration 4 shown in FIG. 13 can also be realized by software arithmetic processing by a microcomputer.

When the units are realized by software arithmetic processing by a microcomputer, the circuit scale and the cost are inhibited from growing. When the units are realized by hardware, delays in the response can be prevented.

In the embodiment described above, the first AND circuit 63-the fourth AND circuit 66 output a low level to the first driving circuit 41-the fourth driving circuit 44, respectively, when the output value of the hysteresis comparators is a low level and output the PWM1 signal-the PWM4 signal to the first driving circuit 41-the fourth driving circuit 44, respectively, when the output value of the hysteresis comparators is a high level. A selection circuit (e.g., a multiplexer) may be used in place of the first AND circuit 63-the fourth AND circuit 66. When the output value of the hysteresis comparators is a low level, the selection circuit selects the output value of the hysteresis comparators and outputs the selected value to each of the first driving circuit 41-the fourth driving circuit 44. When the output value of the hysteresis comparators is a high level, the selection circuit selects the PWM1 signal-the PWM4 signal and outputs the selected signals to the first driving circuit 41-the fourth driving circuit 44, respectively.

In the embodiment described above, it is possible to replace the seventeenth switching element Q17 and the eighteenth switching element Q18 by one switching element having a large withstand voltage. A similar replacement may take place for the nineteenth switching element Q19 and the twentieth switching element Q20, the twenty-first switching element Q21 and the twenty-second switching element Q22, and the twenty-third switching element Q23 and the twenty-fourth switching element Q24.

In the embodiment described above, the multilevel power converter providing an output five or more levels has been described, but the disclosure is equally applicable to multilevel power converters providing an output at seven or more levels. The multilevel output unit has a leg comprised of three or more groups (the flying capacitor circuit described above) connected in series, each group including one flying capacitor and four switching elements. The multilevel output unit includes two legs in a single-phase system and includes three legs in a three-phase system. The two or three legs are connected in parallel across the ends of the DC power supply 2.

The embodiments may be defined by the following items.

[Item 1]

A power converter (1) including:

an inverter circuit (10) that converts a DC voltage supplied from a DC power supply (2) into an AC voltage;

a filter circuit (20) that approximates a waveform of an output voltage of the inverter circuit (10) to a sinusoidal wave;

a driving circuit (40) that drives a plurality of switching elements (Q1-Q24) included in the inverter circuit (10); and an excess current protection circuit (60) that supplies a block signal for turning off the plurality of switching elements (Q1-Q24) to the driving circuit (40) when an excess current is detected, wherein the inverter circuit (10) includes:

a multilevel output unit (11-14) that includes a plurality of flying capacitors (C1-C4) and is capable of outputting a potential at five or more levels from two nodes; and a polarity switching unit (15, 16) that controls a direction of a current flowing between the two nodes of the multilevel output unit (11-14), wherein when at least one of an abnormal voltage in any of the plurality of flying capacitors (C1-C4) and an abrupt change in an output voltage of the power converter (1) occurs, voltages other than a positive voltage of the DC power supply (2), a negative voltage of the DC power supply (2), and a zero voltage are restricted from being output from the inverter circuit (10).

According to this item, suspension of the inverter circuit (10) due to an excess voltage or an insufficient voltage of the flying capacitor (C1-C4) is avoided and continuation of the operation of the power converter (1) can be secured, when at least one of an abnormal voltage in any of the plurality of flying capacitors (C1-C4) and an abrupt change in an output voltage of the power converter (1) occurs.

[Item 2]

The power converter (1) according to item 1, further comprising:

a control unit (30) that generates a control signal for causing an output current of the power converter (1) to match a target current and supplies the control signal to the driving circuit (40), wherein an AC-side terminal of the power converter (1) is connected to a power grid (3), and when an excess current flows in the filter circuit (20), the excess current protection circuit (60) keeps supplying a block signal to the driving circuit (40) at least until an absolute value of a current flowing in the filter circuit (20) becomes smaller than an absolute value of the target current.

According to this item, suspension of the inverter circuit (10) due to an excess voltage or an insufficient voltage of the flying capacitor (C1-C4) is avoided and continuation of the operation of the power converter (1) can be secured, in the event of a grid disturbance.

[Item 3]

The power converter (1) according to item 2, wherein the excess current protection circuit (60) includes:

a hysteresis comparator (61, R1-R3, 62, R4-R6) that compares a value of the current flowing in the filter circuit (20) with a reference threshold value; and a logic circuit (63-66) or a selection circuit that compares an output value of the hysteresis comparator (61, R1-R3, 62, R4-R6) with the control signal supplied from the control unit (30) and supplies a low level as a block signal to the driving circuit (40) when the output value of the hysteresis comparator (61, R1-R3, 62, R4-R6) is a low level and supplies the driving circuit (40) with the control signal supplied from the control unit (30) when the output value of the hysteresis comparator (61, R1-R3, 62, R4-R6) is a high level, wherein a breadth of a dead zone of the hysteresis comparator (61, R1-R3, 62, R4-R6) is set to a breadth that at least ensures that the absolute value of the current flowing in the filter circuit (20) becomes smaller than the absolute value of the target current after the value of the current flowing in the filter circuit (20) reaches the reference threshold for detecting an excess current.

By configuring the breadth of the dead zone of the hysteresis comparator (61, R1-R3, 62, R4-R6) to be large, the absolute value of the current after detection of an excess current can be minimized, and the positive voltage of the DC power supply (2) or the negative voltage of the DC power supply (2) can be output from the inverter circuit (10).

According to this item, charging or discharging of the flying capacitors (C1-C4) is suspended so that suspension of the inverter circuit (10) due to an excess voltage or an insufficient voltage of the flying capacitor (C1-C4) is avoided.

[Item 4]

The power converter (1) according to item 1, further including:

a control unit (30) that supplies a control signal to the driving circuit (40), wherein an AC-side terminal of the power converter (1) is connected to a power grid (3), and during a condition fulfillment period, the control unit (30) controls the driving circuit (40) to cause the inverter circuit (10) to output an AC voltage generated by three voltages, namely, a positive voltage of the DC power supply (2), a negative voltage of the DC power supply (2), and a zero voltage, the condition fulfillment period being at least one of a period during which the voltage of one of the plurality of flying capacitors (C1-C4) is abnormal and a predetermined period since a drop in an instantaneous voltage of the power grid (3) is detected.

According to this item, charging or discharging of the flying capacitors (C1-C4) is suspended during the condition fulfillment period so that suspension of the inverter circuit (10) due to an excess voltage or an insufficient voltage of the flying capacitor (C1-C4) is avoided.

[Item 5] The power converter (1) according to item 4, wherein the control unit (30) includes:

a comparison unit (31, 32) that compares a duty value based on a deviation of an output current of the power converter (1) from a target current with a value of a carrier wave and outputs a pulse width modulation (PWM) signal based on a result of comparison; and a selection unit (36) that selects a PWM signal for causing the inverter circuit (10) to output an AC voltage generated by three voltages, namely, a positive voltage of the DC power supply (2), a negative voltage of the DC power supply (2), and a zero voltage to the inverter circuit (10) or a PWM signal for causing the inverter circuit (10) to output a pseudo sinusoidal wave output from the comparison unit (31, 32) to the inverter circuit (10) and supplies the selected PWM signal to the driving circuit (40), wherein the selection unit (36) selects the PWM signal for causing an AC voltage generated by the three voltages to be output during the condition fulfillment period and selects the PWM signal for causing the pseudo sinusoidal wave to be output during periods other than the condition fulfillment period.

According to this item, charging or discharging of the flying capacitors (C1-C4) is suspended during the condition fulfillment period so that suspension of the inverter circuit (10) due to an excess voltage or an insufficient voltage of the flying capacitor (C1-C4) is avoided.

[Item 6]

The power converter (1) according to item 4, wherein the control unit (30) includes:

a selection unit (36) that selects a duty value for causing the inverter circuit (10) to output a pseudo sinusoidal wave based on a deviation of an output current of the power converter (1) from a target current to the inverter circuit (10) or a duty value for causing the inverter circuit (10) to output an AC voltage generated by three voltages, namely, the positive voltage of the DC power supply (2), the negative voltage of the DC power supply (2), and the zero voltage to the inverter circuit (10); and a comparison unit (31, 32) that compares the duty value selected by the selection unit (36) with a value of a carrier wave and supplies a PWM signal based on a result of comparison to the driving circuit (40), wherein the selection unit (36) selects the duty value for causing an AC voltage generated by the three voltages to be output during the condition fulfillment period and selects the duty value for causing the pseudo sinusoidal wave to be output during periods other than the condition fulfillment period.

According to this item, charging or discharging of the flying capacitors (C1-C4) is suspended during the condition fulfillment period so that suspension of the inverter circuit (10) due to an excess voltage or an insufficient voltage of the flying capacitor (C1-C4) is avoided.

[Item 7]

The power converter (1) according to any one of items 1 through 6, wherein the multilevel output unit (11-14) includes:

a first flying capacitor circuit (11) that includes: a first switching element (Q1), a second switching element (Q2), a third switching element (Q3), and a fourth switching element (Q4) connected in series; and a first flying capacitor (C1) connected between a node between the first switching element (Q1) and the second switching element (Q2) and a node between the third switching element (Q3) and the fourth switching element (Q4);

a second flying capacitor circuit (12) that includes: a fifth switching element (Q5), a sixth switching element (Q6), a seventh switching element (Q7), and an eighth switching element (Q8) connected in series; and a second flying capacitor (C2) connected between a node between the fifth switching element (Q5) and the sixth switching element (Q6) and a node between the seventh switching element (Q7) and the eighth switching element (Q8);

a third flying capacitor circuit (13) that includes: a ninth switching element (Q9), a tenth switching element (Q10), an eleventh switching element (Q11), and a twelfth switching element (Q12) connected in series; and a third flying capacitor (C3) connected between a node between the ninth switching element (Q9) and the tenth switching element (Q10) and a node between the eleventh switching element (Q11) and the twelfth switching element (Q12); and a fourth flying capacitor circuit (14) that includes: a thirteenth switching element (Q13), a fourteenth switching element (Q14), a fifteenth switching element (Q15), and a sixteenth switching element (Q16) connected in series; and a fourth flying capacitor (C4) connected between a node between the thirteenth switching element (Q13) and the fourteenth switching element (Q14) and a node between the fifteenth switching element (Q15) and the sixteenth switching element (Q16), wherein the polarity switching unit (15, 16) includes:

a first output circuit (15) that includes a seventeenth switching element (Q17), an eighteenth switching element (Q18), a nineteenth switching element (Q19), and a twentieth switching element (Q20) connected in series between a midpoint of the first flying capacitor circuit (11) and a midpoint of the second flying capacitor circuit (12), a node between the eighteenth switching element (Q18) and the nineteenth switching element (Q19) being connected to one end of an AC path connected to a power grid (3); and a second output circuit (16) that includes a twenty-first switching element (Q21), a twenty-second switching element (Q22), a twenty-third switching element (Q23), and a twenty-fourth switching element (Q24) connected in series between a midpoint of the third flying capacitor circuit (13) and a midpoint of the fourth flying capacitor circuit (14), a node between the twenty-second switching element (Q22) and the twenty-third switching element (Q23) being connected to the other end of the AC path, the first flying capacitor circuit (11) and the second flying capacitor circuit (12) are connected in series between ends of the DC power supply (2), the third flying capacitor circuit (13) and the fourth flying capacitor circuit (14) are connected in series between ends of the DC power supply (2), and an intermediate wiring connects between a node between the first flying capacitor circuit (11) and the second flying capacitor circuit (12) and a node between the third flying capacitor circuit (13) and the fourth flying capacitor (14).

According to this item, the inverter circuit (10) capable of outputting a five-level pseudo sinusoidal wave and a three-level AC voltage can be configured.

[Item 8]

The power converter (1) according to item 4, wherein the multilevel output unit (11-14) includes:

a first flying capacitor circuit (11) that includes: a first switching element (Q1), a second switching element (Q2), a third switching element (Q3), and a fourth switching element (Q4) connected in series; and a first flying capacitor (C1) connected between a node between the first switching element (Q1) and the second switching element (Q2) and a node between the third switching element (Q3) and the fourth switching element (Q4);

a second flying capacitor circuit (12) that includes: a fifth switching element (Q5), a sixth switching element (Q6), a seventh switching element (Q7), and an eighth switching element (Q8) connected in series; and a second flying capacitor (C2) connected between a node between the fifth switching element (Q5) and the sixth switching element (Q6) and a node between the seventh switching element (Q7) and the eighth switching element (Q8);

a third flying capacitor circuit (13) that includes: a ninth switching element (Q9), a tenth switching element (Q10), an eleventh switching element (Q11), and a twelfth switching element (Q12) connected in series; and a third flying capacitor (C3) connected between a node between the ninth switching element (Q9) and the tenth switching element (Q10) and a node between the eleventh switching element (Q11) and the twelfth switching element (Q12); and a fourth flying capacitor circuit (14) that includes: a thirteenth switching element (Q13), a fourteenth switching element (Q14), a fifteenth switching element (Q15), and a sixteenth switching element (Q16) connected in series; and a fourth flying capacitor (C4) connected between a node between the thirteenth switching element (Q13) and the fourteenth switching element (Q14) and a node between the fifteenth switching element (Q15) and the sixteenth switching element (Q16), wherein the polarity switching unit (15, 16) includes:

a first output circuit (15) that includes a seventeenth switching element (Q17), an eighteenth switching element (Q18), a nineteenth switching element (Q19), and a twentieth switching element (Q20) connected in series between a midpoint of the first flying capacitor circuit (11) and a midpoint of the second flying capacitor circuit (12), a node between the eighteenth switching element (Q18) and the nineteenth switching element (Q19) being connected to one end of an AC path connected to a power grid (3); and a second output circuit (16) that includes a twenty-first switching element (Q21), a twenty-second switching element (Q22), a twenty-third switching element (Q23), and a twenty-fourth switching element (Q24) connected in series between a midpoint of the third flying capacitor circuit (13) and a midpoint of the fourth flying capacitor circuit (14), a node between the twenty-second switching element (Q22) and the twenty-third switching element (Q23) being connected to the other end of the AC path, the first flying capacitor circuit (11) and the second flying capacitor circuit (12) are connected in series between ends of the DC power supply (2), the third flying capacitor circuit (13) and the fourth flying capacitor circuit (14) are connected in series between ends of the DC power supply (2), an intermediate wiring connects between a node between the first flying capacitor circuit (11) and the second flying capacitor circuit (12) and a node between the third flying capacitor circuit (13) and the fourth flying capacitor (14), the control unit (30) includes:

a first comparison unit (31) that compares a duty value based on a deviation of an output current of the power converter (1) from a target current with a value of a first carrier wave;

a first inversion unit (33) that inverts a result of comparison of the first comparison unit (31);

a second comparison unit (32) that compares the duty value with a value of a second carrier wave having a phase shifted from the first carrier wave by a half cycle; and a second inversion unit (34) that inverts a result of comparison of the second comparison unit (32);

an output value of the first comparison unit (31) is supplied to a first driving circuit (41) for driving the first switching element (Q1), the fifth switching element (Q5), the ninth switching element (Q9), and the thirteenth switching element (Q13), an output value of the first inversion unit (33) is supplied to a second driving circuit (42) for driving the fourth switching element (Q4), the eighth switching element (Q8), the twelfth switching element (Q12), and the sixteenth switching element (Q16), an output value of the second comparison unit (32) is supplied to a third driving circuit (43) for driving the second switching element (Q2), the sixth switching element (Q6), the tenth switching element (Q10), and the fourteenth switching element (Q14), an output value of the second inversion unit (34) is supplied to a fourth driving circuit (44) for driving the third switching element (Q3), the seventh switching element (Q7), the eleventh switching element (Q11), and the fifteenth switching element (Q15), and the control unit (30) inverts a polarity of one of four input values input to the first comparison unit (31) and the second comparison unit (32) during the condition fulfillment period.

According to this item, charging or discharging of the flying capacitors (C1-C4) is suspended during the condition fulfillment period so that suspension of the inverter circuit (10) due to an excess voltage or an insufficient voltage of the flying capacitor (C1-C4) is avoided.

INDUSTRIAL APPLICABILITY

The present disclosure is applicable to flying capacitor multilevel power converters.

REFERENCE SIGNS LIST 1 power converter, 2 DC power supply, 3 grid, 10 inverter circuit, 11-14 flying capacitor circuit, 15, 16 output circuit, 20 filter circuit, 30 control unit, 31, 32 comparator, 33, 34 NOT circuit, 35 duty value generation unit, 36 multiplexer, 37 flag generation unit, 38 three-level pattern signal output unit, 39 three-level duty value generation unit, 310 multiplier, 311 flag generation unit, 40 driving circuit, 50 bus voltage measurement unit, 51-54 voltage measurement unit, 55 first intermediate voltage measurement unit, 56 second intermediate voltage measurement unit, 57 reactor current measurement unit, 58 output voltage measurement unit, 59 output current measurement unit, 60 excess current protection circuit, 61 62, operational amplifier, 63-66 AND circuit, R1-R7 resistor, Q1-Q24 switching element, D1-D24 diode, C1-C4 flying capacitor, C5, C6 split capacitor, C7 output capacitor, L1, L2 reactor

The invention claimed is:

1. A power converter comprising:
an inverter circuit that converts a DC voltage supplied from a DC power supply into an AC voltage;
a filter circuit that approximates a waveform of an output voltage of the inverter circuit to a sinusoidal wave;
a driving circuit that drives a plurality of switching elements included in the inverter circuit; and
an excess current protection circuit that supplies a block signal for turning off the plurality of switching elements to the driving circuit when an excess current is detected, wherein
the inverter circuit includes:
a multilevel output unit that includes a plurality of flying capacitors and is capable of outputting a potential at five or more levels from two nodes; and
a polarity switching unit that controls a direction of a current flowing between the two nodes of the multilevel output unit, wherein
when at least one of an abnormal voltage in any of the plurality of flying capacitors and an abrupt change in an output voltage of the power converter occurs, voltages other than a positive voltage of the DC power supply, a negative voltage of the DC power supply, and a zero voltage are restricted from being output from the inverter circuit.

2. The power converter according to claim 1, further comprising:
a control unit that generates a control signal for causing an output current of the power converter to match a target current and supplies the control signal to the driving circuit, wherein
an AC-side terminal of the power converter is connected to a power grid, and when an excess current flows in the filter circuit, the excess current protection circuit keeps supplying a block signal to the driving circuit at least until an absolute value of a current flowing in the filter circuit becomes smaller than an absolute value of the target current.

3. The power converter according to claim 2, wherein the excess current protection circuit comprises:
a hysteresis comparator that compares a value of the current flowing in the filter circuit with a reference threshold value; and
a logic circuit or a selection circuit that compares an output value of the hysteresis comparator with the control signal supplied from the control unit and supplies a low level as a block signal to the driving circuit when the output value of the hysteresis comparator is a low level and supplies the driving circuit with the control signal supplied from the control unit when the output value of the hysteresis comparator is a high level, wherein
a breadth of a dead zone of the hysteresis comparator is set to a breadth that at least ensures that the absolute value of the current flowing in the filter circuit becomes smaller than the absolute value of the target current after the value of the current flowing in the filter circuit reaches the reference threshold for detecting an excess current.

4. The power converter according to claim 1, further comprising:
a control unit that supplies a control signal to the driving circuit, wherein
an AC-side terminal of the power converter is connected to a power grid, and
during a condition fulfillment period, the control unit controls the driving circuit to cause the inverter circuit to output an AC voltage generated by three voltages, namely, a positive voltage of the DC power supply, a negative voltage of the DC power supply, and a zero voltage, the condition fulfillment period being at least one of a period during which the voltage of one of the plurality of flying capacitors is abnormal and a predetermined period since a drop in an instantaneous voltage of the power grid is detected.

5. The power converter according to claim 4, wherein the control unit includes:
a comparison unit that compares a duty value based on a deviation of an output current of the power converter from a target current with a value of a carrier wave and outputs a pulse width modulation (PWM) signal based on a result of comparison; and
a selection unit that selects a PWM signal for causing the inverter circuit to output an AC voltage generated by three voltages, namely, a positive voltage of the DC power supply, a negative voltage of the DC power supply, and a zero voltage to the inverter circuit or a PWM signal for causing the inverter circuit to output a pseudo sinusoidal wave output from the comparison unit to the inverter circuit and supplies the selected PWM signal to the driving circuit, wherein
the selection unit selects the PWM signal for causing an AC voltage generated by the three voltages to be output during the condition fulfillment period and selects the PWM signal for causing the pseudo sinusoidal wave to be output during periods other than the condition fulfillment period.

6. The power converter according to claim 4, wherein the control unit includes:

a selection unit that selects a duty value for causing the inverter circuit to output a pseudo sinusoidal wave based on a deviation of an output current of the power converter from a target current to the inverter circuit or a duty value for causing the inverter circuit to output an AC voltage generated by three voltages, namely, the positive voltage of the DC power supply, the negative voltage of the DC power supply, and the zero voltage to the inverter circuit; and
a comparison unit that compares the duty value selected by the selection unit with a value of a carrier wave and supplies a PWM signal based on a result of comparison to the driving circuit, wherein
the selection unit selects the duty value for causing an AC voltage generated by the three voltages to be output during the condition fulfillment period and selects the duty value for causing the pseudo sinusoidal wave to be output during periods other than the condition fulfillment period.

7. The power converter according to claim 1, wherein the multilevel output unit includes:
a first flying capacitor circuit that includes: a first switching element, a second switching element, a third switching element, and a fourth switching element connected in series; and a first flying capacitor connected between a node between the first switching element and the second switching element and a node between the third switching element and the fourth switching element;
a second flying capacitor circuit that includes: a fifth switching element, a sixth switching element, a seventh switching element, and an eighth switching element connected in series; and a second flying capacitor connected between a node between the fifth switching element and the sixth switching element and a node between the seventh switching element and the eighth switching element;
a third flying capacitor circuit that includes: a ninth switching element, a tenth switching element, an eleventh switching element, and a twelfth switching element connected in series; and a third flying capacitor connected between a node between the ninth switching element and the tenth switching element and a node between the eleventh switching element and the twelfth switching element; and
a fourth flying capacitor circuit that includes: a thirteenth switching element, a fourteenth switching element, a fifteenth switching element, and a sixteenth switching element connected in series; and a fourth flying capacitor connected between a node between the thirteenth switching element and the fourteenth switching element and a node between the fifteenth switching element and the sixteenth switching element, wherein
the polarity switching unit includes:
a first output circuit that includes a seventeenth switching element, an eighteenth switching element, a nineteenth switching element, and a twentieth switching element connected in series between a midpoint of the first flying capacitor circuit and a midpoint of the second flying capacitor circuit, a node between the eighteenth switching element and the nineteenth switching element being connected to one end of an AC path connected to a power grid; and
a second output circuit that includes a twenty-first switching element, a twenty-second switching element, a twenty-third switching element, and a twenty-fourth switching element connected in series between a midpoint of the third flying capacitor circuit and a midpoint of the fourth flying capacitor circuit, a node between the twenty-second switching element and the twenty-third switching element being connected to the other end of the AC path, the first flying capacitor circuit and the second flying capacitor circuit are connected in series between ends of the DC power supply, the third flying capacitor circuit and the fourth flying capacitor circuit are connected in series between ends of the DC power supply, and an intermediate wiring connects between a node between the first flying capacitor circuit and the second flying capacitor circuit and a node between the third flying capacitor circuit and the fourth flying capacitor.

8. The power converter according to claim 4, wherein the multilevel output unit includes:

a first flying capacitor circuit that includes: a first switching element, a second switching element, a third switching element, and a fourth switching element connected in series; and a first flying capacitor connected between a node between the first switching element and the second switching element and a node between the third switching element and the fourth switching element;

a second flying capacitor circuit that includes: a fifth switching element, a sixth switching element, a seventh switching element, and an eighth switching element connected in series; and a second flying capacitor connected between a node between the fifth switching element and the sixth switching element and a node between the seventh switching element and the eighth switching element;

a third flying capacitor circuit that includes: a ninth switching element, a tenth switching element, an eleventh switching element, and a twelfth switching element connected in series; and a third flying capacitor connected between a node between the ninth switching element and the tenth switching element and a node between the eleventh switching element and the twelfth switching element; and a fourth flying capacitor circuit that includes: a thirteenth switching element, a fourteenth switching element, a fifteenth switching element, and a sixteenth switching element connected in series; and a fourth flying capacitor connected between a node between the thirteenth switching element and the fourteenth switching element and a node between the fifteenth switching element and the sixteenth switching element, wherein the polarity switching unit includes:

a first output circuit that includes a seventeenth switching element, an eighteenth switching element, a nineteenth switching element, and a twentieth switching element connected in series between a midpoint of the first flying capacitor circuit and a midpoint of the second flying capacitor circuit, a node between the eighteenth switching element and the nineteenth switching element being connected to one end of an AC path connected to a power grid; and a second output circuit that includes a twenty-first switching element, a twenty-second switching element, a twenty-third switching element, and a twenty-fourth switching element connected in series between a midpoint of the third flying capacitor circuit and a midpoint of the fourth flying capacitor circuit, a node between the twenty-second switching element and the twenty-third switching element being connected to the other end of the AC path, the first flying capacitor circuit and the second flying capacitor circuit are connected in series between ends of the DC power supply, the third flying capacitor circuit and the fourth flying capacitor circuit are connected in series between ends of the DC power supply, an intermediate wiring connects between a node between the first flying capacitor circuit and the second flying capacitor circuit and a node between the third flying capacitor circuit and the fourth flying capacitor, the control unit includes:

a first comparison unit that compares a duty value based on a deviation of an output current of the power converter from a target current with a value of a first carrier wave;

a first inversion unit that inverts a result of comparison of the first comparison unit;

a second comparison unit that compares the duty value with a value of a second carrier wave having a phase shifted from the first carrier wave by a half cycle; and a second inversion unit that inverts a result of comparison of the second comparison unit;

an output value of the first comparison unit is supplied to a first driving circuit for driving the first switching element, the fifth switching element, the ninth switching element, and the thirteenth switching element, an output value of the first inversion unit is supplied to a second driving circuit for driving the fourth switching element, the eighth switching element, the twelfth switching element, and the sixteenth switching element, an output value of the second comparison unit is supplied to a third driving circuit for driving the second switching element, the sixth switching element, the tenth switching element, and the fourteenth switching element, an output value of the second inversion unit is supplied to a fourth driving circuit for driving the third switching element, the seventh switching element, the eleventh switching element, and the fifteenth switching element, and the control unit inverts a polarity of one of four input values input to the first comparison unit and the second comparison unit during the condition fulfillment period.

\* \* \* \* \*